(12) United States Patent
Kim et al.

(10) Patent No.: US 12,235,005 B2
(45) Date of Patent: Feb. 25, 2025

(54) REFRIGERATOR AND METHOD OF CONTROLLING THE SAME

(71) Applicant: LG ELECTRONICS INC., Seoul (KR)

(72) Inventors: Sungwook Kim, Seoul (KR); Sangbok Choi, Seoul (KR); Namsoo Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 414 days.

(21) Appl. No.: 17/637,256

(22) PCT Filed: Aug. 20, 2020

(86) PCT No.: PCT/KR2020/011091
§ 371 (c)(1),
(2) Date: Feb. 22, 2022

(87) PCT Pub. No.: WO2021/045415
PCT Pub. Date: Mar. 11, 2021

(65) Prior Publication Data
US 2022/0307718 A1    Sep. 29, 2022

(30) Foreign Application Priority Data

Sep. 3, 2019 (KR) .......................... 10-2019-0108881

(51) Int. Cl.
*F24F 11/63* (2018.01)
(52) U.S. Cl.
CPC .................................. *F24F 11/63* (2018.01)
(58) Field of Classification Search
CPC ...... F24F 11/63; F25D 17/062; F25D 17/045; F25D 17/065; F25D 19/04;
(Continued)

(56) References Cited

U.S. PATENT DOCUMENTS 6,006,530 A    12/1999  Lee et al.
10,113,790 B2  10/2018  Seo
(Continued)

FOREIGN PATENT DOCUMENTS

CN    201066230    5/2008
CN    102374725    3/2012
(Continued)

OTHER PUBLICATIONS

Chinese Notice of Allowance dated Feb. 7, 2024 issued in Application No. 202080061858.2.
(Continued)

*Primary Examiner* — Nelson J Nieves
*Assistant Examiner* — Matthew John Moscola
(74) *Attorney, Agent, or Firm* — KED & ASSOCIATES, LLP

(57) ABSTRACT

A method of controlling a refrigerator including a cold air generator and a cold air transmission unit includes, when a temperature of the storage compartment becomes equal to or greater than a first reference temperature, operating the cold air generator with predetermined cooling power and turning on and operating the cold air transmitter with predetermined output, upon determining that the temperature of the storage compartment becomes equal to or less than a second reference temperature lower than the first reference temperature, turning off the cold air transmitter, and, upon determining that the temperature of the storage compartment becomes equal to or greater than the first reference temperature, turning on the cold air transmitter again, wherein a controller determines operation output of the cold air transmitter based on the cooling power of the cold air generator.

19 Claims, 11 Drawing Sheets

(58) Field of Classification Search
CPC ........... F25D 2700/12; F25D 2700/122; F25D 29/00; F25D 2317/068; F25B 2700/2104; F25B 2700/2117; F25B 49/02; F25B 2600/112; Y02B 30/70

See application file for complete search history.

(56) References Cited

U.S. PATENT DOCUMENTS

| | | | |
|---|---|---|---|
| 2006/0130504 | A1 | 6/2006 | Agrawal et al. |
| 2011/0175742 | A1* | 7/2011 | Shin .................. F25D 29/00 700/282 |
| 2019/0107322 | A1 | 4/2019 | Lee et al. |
| 2019/0120533 | A1 | 4/2019 | Lee et al. |
| 2021/0095881 | A1* | 4/2021 | Lian .................. F24F 11/77 |

FOREIGN PATENT DOCUMENTS

| | | |
|---|---|---|
| CN | 105222511 | 1/2016 |
| CN | 108759296 | 11/2018 |
| JP | 09-145214 | 6/1997 |
| KR | 10-1997-0022182 | 5/1997 |
| KR | 10-1998-085104 | 12/1998 |
| KR | 10-2011-0087465 | 8/2011 |
| KR | 10-2018-0061753 | 6/2018 |
| KR | 10-2018-0061762 | 6/2018 |

OTHER PUBLICATIONS

International Search Report dated Nov. 13, 2020 issued in Application No. PCT/KR2020/011091.
Chinese Office Action dated Apr. 26, 2023 issued in Application No. 202080061858.2.
Extended European Search Report dated Aug. 11, 2023, issued in Application No. 20860047.8.

* cited by examiner

REFRIGERATOR AND METHOD OF CONTROLLING THE SAME

CROSS-REFERENCE TO RELATED PATENT APPLICATIONS

This application is a U.S. National Stage Application under 35 U.S.C. § 371 of PCT Application No. PCT/KR2020/011091, filed Aug. 20, 2020, which claims priority to Korean Patent Application No. 10-2019-0108881, filed Sep. 3, 2019, whose entire disclosures are hereby incorporated by reference.

TECHNICAL FIELD

The present disclosure relates to a refrigerator and a method of controlling the same.

BACKGROUND ART

A refrigerator is a household appliance for storing food at a low temperature. It is essential to always maintain a storage compartment at a constant low temperature. Currently, in case of a household refrigerator, a storage compartment is maintained at a temperature between upper and lower limits based on a set temperature. That is, the refrigerator is controlled using a method of driving a freezing cycle to cool the storage compartment when the temperature of the storage compartment increases to an upper limit temperature and stopping the freezing cycle when the temperature of the storage compartment reaches a lower limit temperature.

Korean Unexamined Patent Publication No. 1997-0022182 (Publication Date: May 28, 1997) (hereinafter referred to as Prior Art 1) discloses a constant temperature control method of maintaining a storage compartment of a refrigerator at a constant temperature.

According to Prior Art 1, when the temperature of the storage compartment is greater than a set temperature, a compressor and a fan are driven and, at the same time, a storage compartment damper is completely opened, and, when the temperature of the storage compartment is cooled to the set temperature, driving of the compressor and/or the fan is stopped and, at the same time, the storage compartment damper is closed.

According to Prior Art 1, after the compressor is driven due to increase in the temperature of the storage compartment of the refrigerator to the set temperature or more, when the temperature of the storage compartment is cooled to the set temperature or less, the process of stopping driving of the compressor is repeated. Therefore, when the compressor is driven again, power consumption may increase.

In addition, since the damper is completely opened to cool the storage compartment, cold air is highly likely to be excessively supplied to the storage compartment in a state in which the damper is completely opened and thus the storage compartment may be overcooled. That is, it may be difficult to maintain the storage compartment at the constant temperature.

In addition, in a structure in which a damper is provided on a partitioning wall for partitioning a freezing compartment and a refrigerating compartment and the damper is completely opened to cool the refrigerating compartment such that cold air in the freezing compartment is supplied to the refrigerating compartment, the refrigerating compartment may be overcooled due to excessive supply of cold air and the load of the freezing compartment may be rapidly increased.

Korean Unexamined Patent Publication No. 10-2018-0061753 (Publication Date: Jun. 8, 2018) (hereinafter referred to as Prior Art 2) discloses technology for determining the cooling output of a cold air supply unit based on a sum of predetermined cooling output and delay output.

According to Prior Art 2, the cooling output of the cold air supply unit is changed while the cold air supply unit continuously operates without being stopped. However, when a rapid temperature change occurs, since a range for determining the cooling output is limited, it may be impossible to rapidly cope with the rapid temperature change.

DISCLOSURE OF INVENTION

Technical Problem

The present embodiment provides a refrigerator which is controlled to maintain a temperature of a storage compartment in a temperature satisfaction range in order to improve freshness of an object to be stored, and a method of controlling the same.

The present embodiment alternatively or additionally provides a refrigerator which is controlled to maintain a temperature of a storage compartment in a temperature satisfaction range even if a damper is not present in a duct, in the storage compartment, to which cold air is supplied through the duct, and a method of controlling the same.

The present embodiment alternatively or additionally provides a refrigerator capable of reducing power consumption by continuously operating a cold air generator, and a method of controlling the same.

The present embodiment alternatively or additionally provides a refrigerator capable of preventing a temperature of a storage compartment from being out of a temperature satisfaction range and rapidly returning the temperature of the storage compartment to the temperature satisfaction range even if the temperature of the storage compartment is out of the temperature satisfaction range, by varying output of a cold air transmission unit based on the cooling power of a cold air generator, and a method of controlling the same.

Solution to Problem

In a method of controlling a refrigerator according to an aspect, a controller may turn on a cold air transmission unit when a temperature of a storage compartment becomes equal to or greater than a first reference temperature and turn off the cold air transmission unit when the temperature of the storage compartment becomes equal to or less than a second reference temperature.

When the cold air transmission unit is turned on and rotated, the rotation speed of the cold air transmission unit may be determined based on cooling power of a compressor.

A method of controlling a refrigerator includes a cold air generator operating to generate cold air for cooling a storage compartment and a cold air transmission unit operating to transmit cold air to the storage compartment.

The method of controlling the refrigerator may include, when a temperature of the storage compartment becomes equal to or greater than a first reference temperature, operating the cold air generator with predetermined cooling power and turning on and operating the cold air transmission unit with predetermined output.

The method of controlling the refrigerator may further include, upon determining that the temperature of the storage compartment becomes equal to or less than a second reference temperature lower than the first reference temperature, turning off the cold air transmission unit.

The method of controlling the refrigerator may further include, upon determining that the temperature of the storage compartment becomes equal to or greater than the first reference temperature, turning on the cold air transmission unit again.

A controller may determine operation output of the cold air transmission unit based on the cooling power of the cold air generator. When the cold air transmission unit is turned on again, the cold air transmission unit may operate with the determined operation output.

When the cooling power of the cold air generator is less than first reference cooling power, the controller may determine the operation output of the cold air transmission unit as first operation output.

When the cooling power of the cold air generator is equal to or greater than the first reference cooling power, the controller may determine the operation output of the cold air transmission unit as third operation output greater than the first operation output.

One or more of the first operation output and the third operation output of the cold air transmission unit may be changed once or more until the cold air transmission unit is turned off.

While the cold air transmission unit operates with the first operation output, the operation output of the cold air transmission unit may be changed to second operation output less than the first operation output.

While the cold air transmission unit operates with the third operation output, the operation output of the cold air transmission unit may be changed to second operation output less than the first operation output.

A change time point of the operation output of the cold air transmission unit may be determined based on one or more of an ON time of the cold air transmission unit and the temperature of the storage compartment.

When a set time has elapsed while the cold air transmission unit operates after being turned on, the operation output of the cold air transmission unit may be changed.

When a first set time has elapsed while the cold air transmission unit operates with the first operation output, the operation output of the cold air transmission unit may be changed.

When a second set time different from the first set time has elapsed while the cold air transmission unit operates with third operation output, the operation output of the cold air transmission unit may be changed.

When the temperature of the storage compartment becomes equal to or less than a third reference temperature between the first reference temperature and the second reference temperature while the cold air transmission unit operates after being turned on, the operation output of the cold air transmission unit may be changed.

When a set time has elapsed and the temperature of the storage compartment becomes equal to or less than a third reference temperature between the first reference temperature and the second reference temperature while the cold air transmission unit operates after being turned on, the operation output of the cold air transmission unit may be changed.

When the cooling power of the cold air generator is equal to or greater than second reference cooling power greater than the first reference cooling power, the controller may determine the operation output of the cold air transmission unit as the third operation output and maintain the operation output of the cold air transmission unit at the third operation output until the cold air transmission unit is turned off.

When the cold air transmission unit operates with the determined operation output, the operation output may be changed or maintained according to the cooling power of the cold air generator.

The controller may calculate an operating ratio of the cold air transmission unit based on an ON time of the cold air transmission unit and an OFF time of the cold air transmission unit, and determine the cooling power of the cold air generator based on the operating ratio of the cold air transmission unit.

The cold air generator may be a compressor, and the cold air transmission unit may be a cooling fan operating to provide cold air to the storage compartment or a damper configured to open or close a passage for providing cold air to the storage compartment.

According to another aspect, provided is a method of controlling a refrigerator including a cold air generator operating to generate cold air for cooling a storage compartment and a cold air transmission unit operating to transmit cold air to the storage compartment. The method includes, when a temperature of the storage compartment becomes equal to or greater than a first reference temperature, operating the cold air generator with first cooling power and operating the cold air transmission unit with first output, and, upon determining that the temperature of the storage compartment becomes equal to or less than second reference temperature lower than the first reference temperature, turning off the cold air transmission unit.

The method of controlling the refrigerator may further include, upon determining that the temperature of the storage compartment becomes equal to or greater than the first reference temperature, operating the cold air generator with second cooling power and operating the cold air transmission unit with second output determined based on the second cooling power.

According to another aspect, provided is a method of controlling a refrigerator including a cold air generator operating to generate cold air for cooling a storage compartment and a cold air transmission unit operating to transmit cold air to the storage compartment. The method may include, when a temperature of the storage compartment becomes equal to or greater than a first reference temperature, operating the cold air generator with first cooling power and operating the cold air transmission unit with first output, upon determining that the temperature of the storage compartment becomes equal to or less than second reference temperature lower than the first reference temperature, turning off the cold air transmission unit, and operating the cold air generator with second cooling power.

The method of controlling the refrigerator may further include, upon determining that the temperature of the storage compartment becomes equal to or greater than the first reference temperature, operating the cold air transmission unit with second output determined based on the second cooling power.

According to another aspect, provided is a refrigerator including a storage compartment, a compressor configured to operate to generate cold air for cooling the storage compartment, a cooling fan configured to supply cold air to the storage compartment, a temperature sensor configured to detect a temperature of the storage compartment, and a controller configured to perform control to change a rotation speed of the cooling fan and cooling power of the compressor such that the temperature of the storage compartment is maintained in a range between a first reference temperature and a second reference temperature lower than the first reference temperature.

The controller may turn on the cooling fan when the temperature of the storage compartment becomes equal to greater than the first reference temperature and turn off the cooling fan when the temperature of the storage compartment becomes equal to or less than the second reference temperature. The controller may determine the rotation speed of the cooling fan based on the cooling power of the compressor.

The controller may determine the rotation speed of the cooling fan as a first rotation speed, when the cooling power of the compressor is less than first reference cooling power.

The controller may determine the rotation speed of the cooling fan as a third rotation speed higher than the first rotation speed, when the cooling power of the compressor is equal to or greater than the first reference cooling power.

One or more of the first rotation speed and third rotation speed of the cooling fan may be changed to a second rotation speed lower than the first rotation speed before the cooling fan is turned off.

The controller may calculate an operating ratio of the cooling fan based on an ON time of the cooling fan and an OFF time of the cooling fan and determine the cooling power of the compressor based on the operating ratio of the cooling fan.

Advantageous Effects of Invention

According to the embodiments, since a temperature of a storage compartment is maintained in a temperature satisfaction range, it is possible to improve freshness of an object to be stored.

Since the cooling power of a cold air generator may be changed based on an operating ratio of a cold air transmission unit, the cooling power of the cold air transmission unit may be adjusted in a state in which the cold air generator is turned off, thereby preventing power consumption from increasing due to repeated ON/OFF of the cold air generator.

Even if the cold air generator continuously operates, since the cooling power of the cold air generator may be relatively maintained at cooling power lower than intermediate cooling power between maximum cooling power and minimum cooling power, it is possible to minimize increase in power consumption of the cold air generator.

By varying output of a cold air transmission unit based on the cooling power of a cold air generator, it is possible to prevent the temperature of the storage compartment from being out of a temperature satisfaction range and to rapidly return the temperature of the storage compartment to the temperature satisfaction range even if the temperature of the storage compartment is out of the temperature satisfaction range.

MODE FOR THE INVENTION

Figure 1:
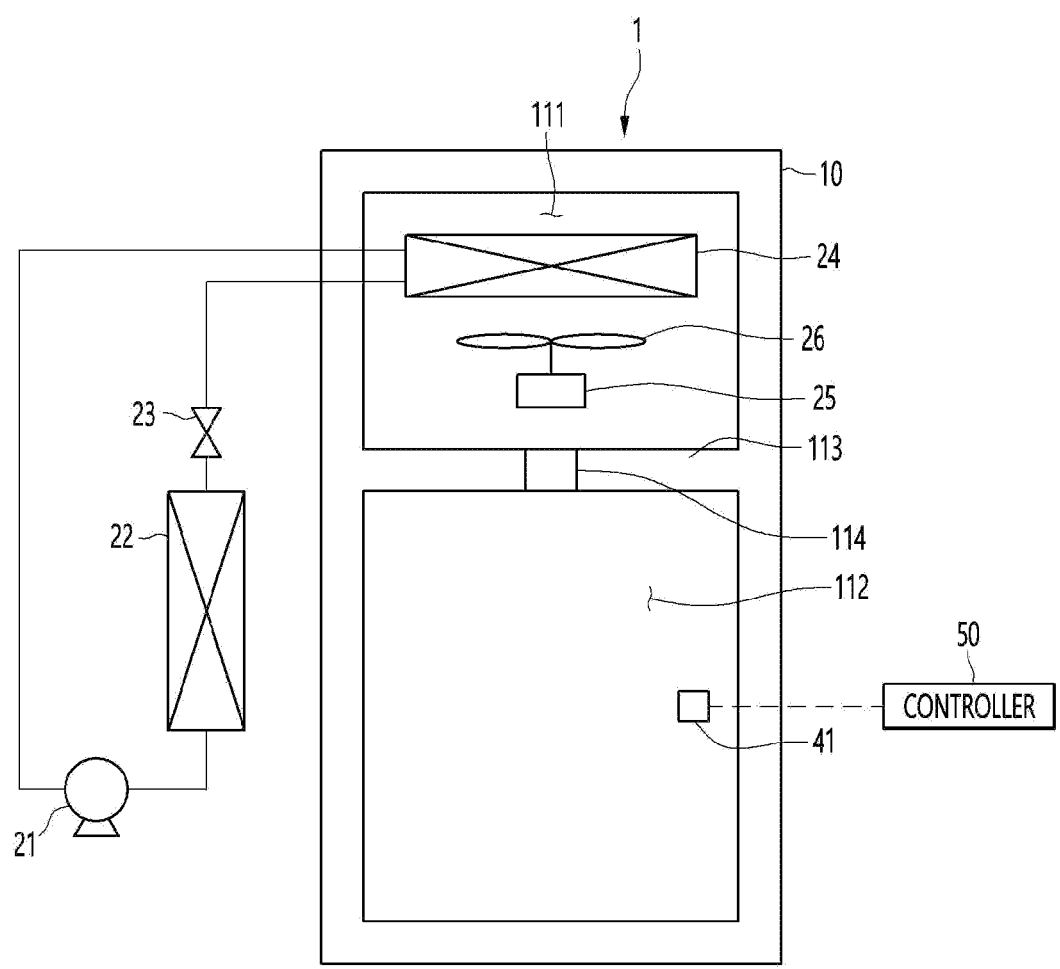
FIG. 1 is a diagram schematically showing the configuration of a refrigerator according to a first embodiment of the present disclosure.
Figure 2:
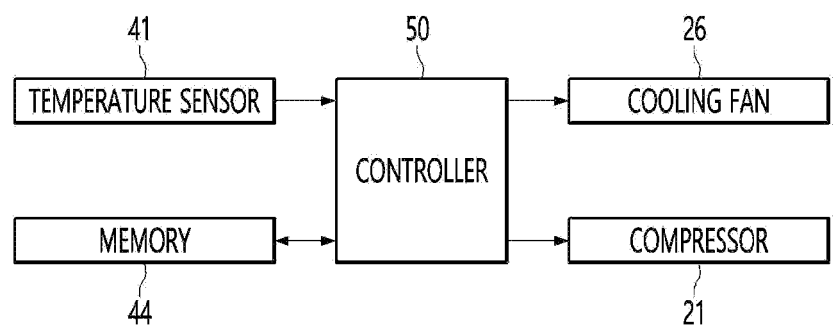
FIG. 2 is a block diagram of a refrigerator according to a first embodiment of the present disclosure.

FIG. 1 is a diagram schematically showing the configuration of a refrigerator according to a first embodiment of the present disclosure, and FIG. 2 is a block diagram of a refrigerator according to a first embodiment of the present disclosure.

Referring to FIGS. 1 and 2, the refrigerator 1 according to the first embodiment of the present disclosure may include a cabinet 10 in which a storage compartment is formed and a storage compartment door coupled to the cabinet 10 to open and close the storage compartment.

The storage compartment may include a freezing compartment 111 and a refrigerating compartment 112. Objects to be stored such as food may be stored in the freezing compartment 111 and the refrigerating compartment 112.

Although FIG. 1 shows, for example, a refrigerator in which the freezing compartment 111 and the refrigerating compartment 112 are arranged in a vertical direction, in the present disclosure, arrangement of the freezing compartment and the refrigerating compartment is not limited and the type of the refrigerator is not limited.

For example, the freezing compartment 111 may be located above the refrigerating compartment 112.

The freezing compartment 111 and the refrigerating compartment 112 may be partitioned in the vertical direction inside the cabinet 10 by a partitioning wall 113. In the partitioning wall 113, a cold air duct 114 for providing a cold air passage for supplying cold air of the freezing compartment 111 to the refrigerating compartment 112 may be provided.

The refrigerator 1 may further include a freezing cycle for cooling the freezing compartment 111 and/or the refrigerating compartment 112.

The freezing cycle may include a compressor 21 for compressing refrigerant, a condenser 22 for condensing the refrigerant which has passed through the compressor 21, an expansion member 23 for expanding the refrigerant which has passed through the condenser 22, and an evaporator 24 for evaporating the refrigerant which has passed through the expansion member 23.

The evaporator 24 may include, for example, a freezing compartment evaporator. That is, the cold air heat-exchanged with the evaporator 24 may be supplied to the freezing compartment 111, and the cold air of the freezing compartment 111 may be supplied to the refrigerating compartment 112 through the cold air duct 114.

In another example, in the cabinet 10, the cold air duct 114 may be disposed at a position other than the partitioning wall 113 such that the cold air of the freezing compartment 111 is guided to the refrigerating compartment 112.

The refrigerator 1 may include a cooling fan 26 for allowing air to flow toward the evaporator 24 for circulation of cold air of the freezing compartment 111 and a fan driving unit 25 for driving the cooling fan 26.

The damper may not be provided in the cold air duct 114. According to the present embodiment, the amount of cold air supplied to the refrigerating compartment 112 may be determined according to ON/OFF of the cooling fan 26 and the rotation speed (RPM) of the cooling fan 26. The temperature of the refrigerating compartment 112 may be changed by the amount of cold air supplied to the refrigerating compartment 112.

In the present embodiment, in order to supply cold air to the freezing compartment 111, the compressor 21 and the cooling fan 26 (or the fan driving unit 25) need to operate.

In the present disclosure, the compressor 21 and the cooling fan 26 (or the fan driving unit 25) may be collectively referred to as a "cooling unit" which operates to cool the storage compartment.

The cooling unit may include one or more of a cold air generator operating to generate cold air and a cold air transmission unit (cold air transmission unit) operating to transit cold air.

The compressor 21 may be called a cold air generator and the cooling fan 26 may be called a cold air transmission unit.

In the present disclosure, the cooling power (or output) of the cold air generator may mean, for example, the cooling power (or output) of the compressor 21 and the output of the cold air transmission unit may mean, for example, the rotation speed of the cooling fan 26.

The operating ratio of the cold air transmission unit may mean a ratio of an ON time to a sum of the ON time and the OFF time of the cooling fan 26 in one ON/OFF period of the cooling fan 26.

Accordingly, the operating ratio of the cold air transmission unit being high mean that the ON time of the cooling fan 26 is long, and the operating ratio of the cold air transmission unit being low means that the ON time of the cooling fan 26 is short.

The refrigerator 1 may further include a temperature sensor 41 for detecting the temperature of the refrigerating compartment 112 and a controller 50 for controlling the cold air generator based on the temperature detected by the temperature sensor 41.

The controller 50 may control one or more of the compressor 21 and the cooling fan 26 such that the temperature of the refrigerating compartment 112 is maintained in a temperature satisfaction range.

For example, the controller 50 may turn on/off the cooling fan 26 or change the rotation speed of the cooling fan 26. The controller 50 may increase, maintain or decrease the cooling power of the compressor 21.

The controller 50 may change the cooling power (or output) of the compressor 21 based on the operating ratio of the cooling fan 26.

The refrigerator 1 may further include a memory 44. In the memory 44, a set temperature (or a target temperature) may be stored. The set temperature may be input through an input (not shown) or may be a temperature basically set in a product. In the memory 44, information on the operating ratio of the cooling fan 26 may be stored.

In the present disclosure, a temperature higher than the set temperature of the refrigerating compartment 112 may be referred to as a first reference temperature and a temperature lower than the set temperature of the refrigerating compartment 112 may be referred to as a second reference temperature. A temperature higher than the first reference temperature may be referred to as an upper limit temperature and the second reference temperature may be referred to as a lower limit temperature.

A range between the first reference temperature and the second reference temperature may be referred to as a temperature satisfaction range. The set temperature may be, for example, an average temperature between the first reference temperature and the second reference temperature.

Hereinafter, a method of controlling a refrigerator in order to maintain the temperature of the refrigerating compartment 112 in the temperature satisfaction range will be described.

Figure 3:
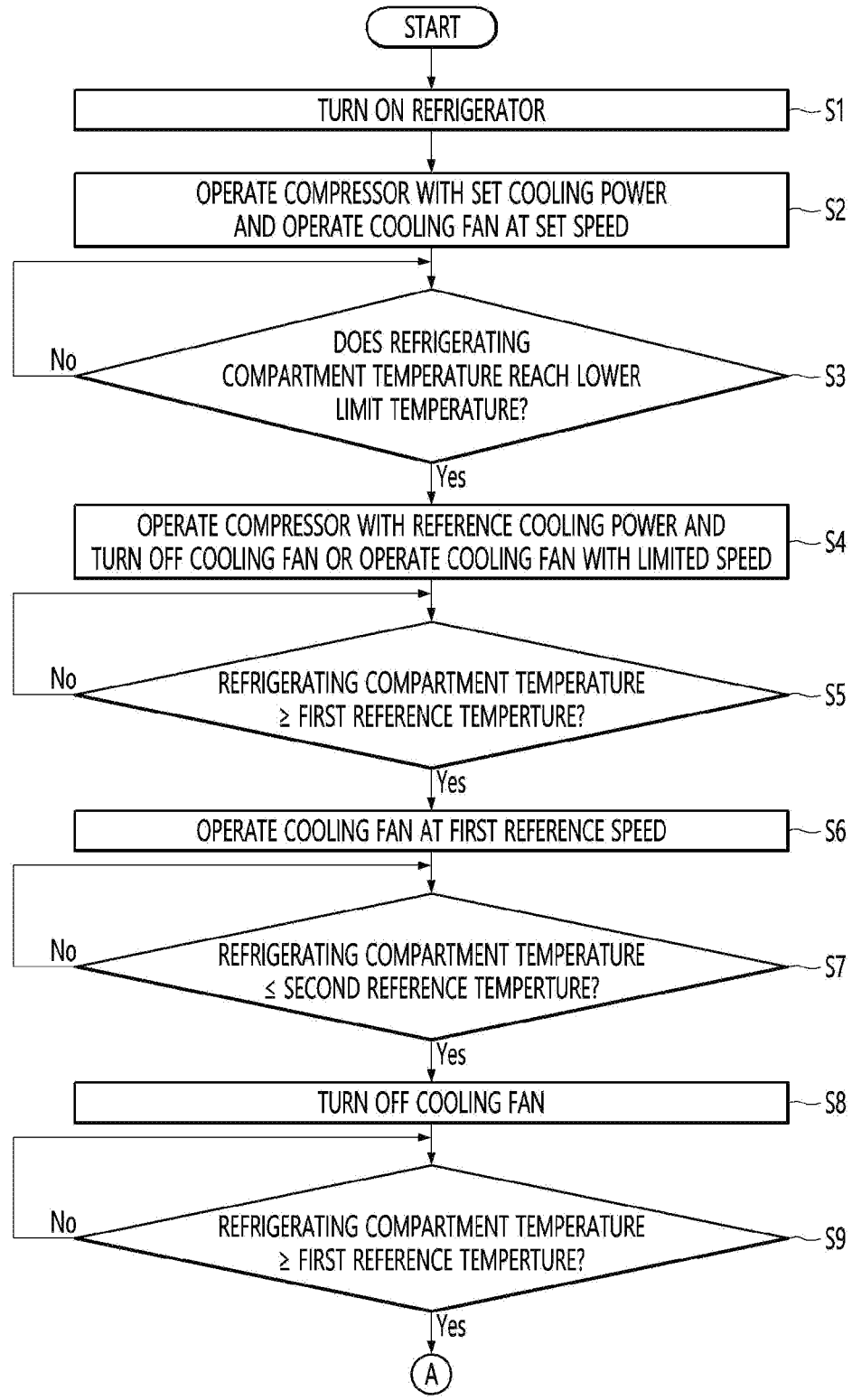
FIGS. 3 to 5 are flowcharts illustrating a method of controlling a refrigerator according to a first embodiment of the present disclosure.
Figure 4:
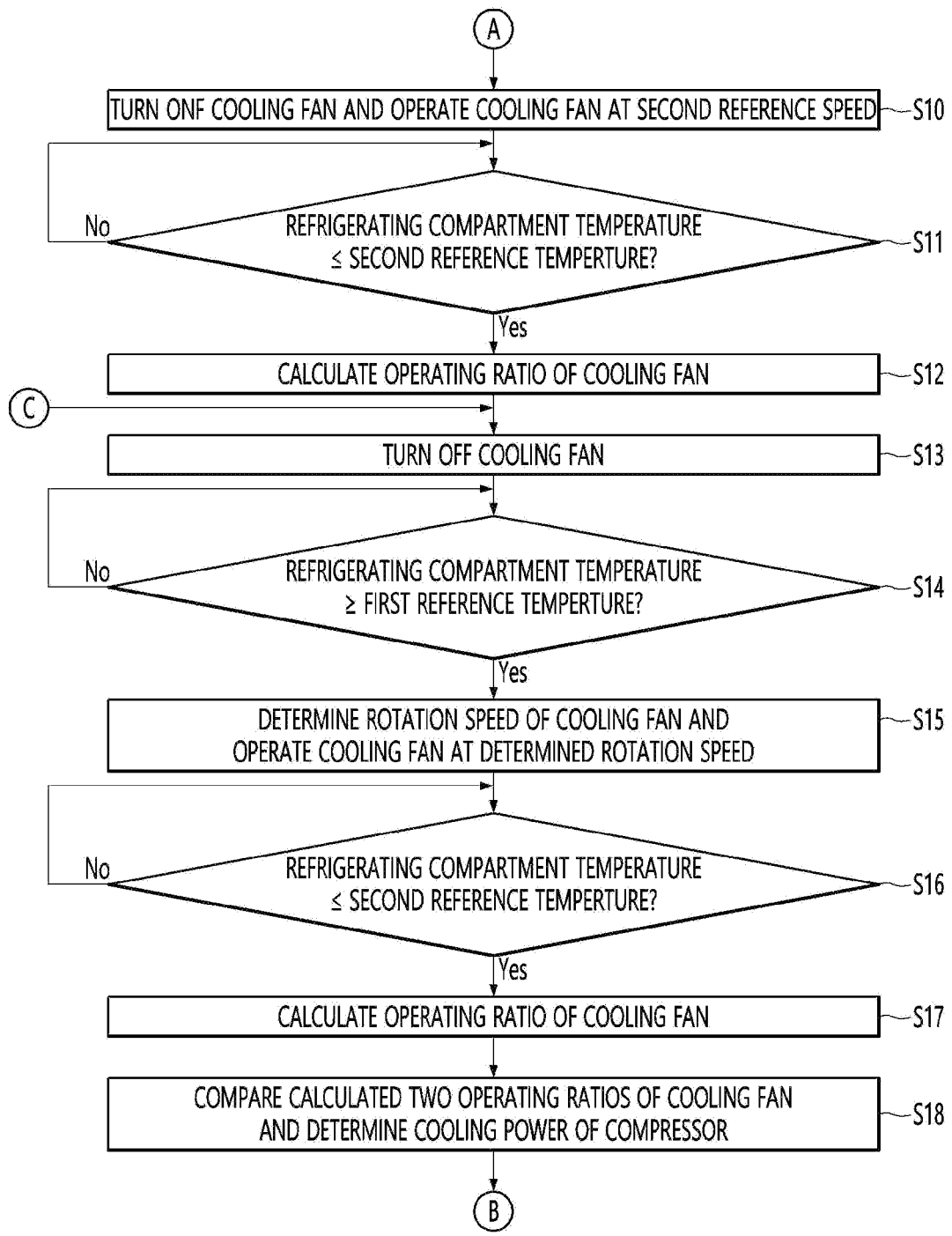
Figure 5:
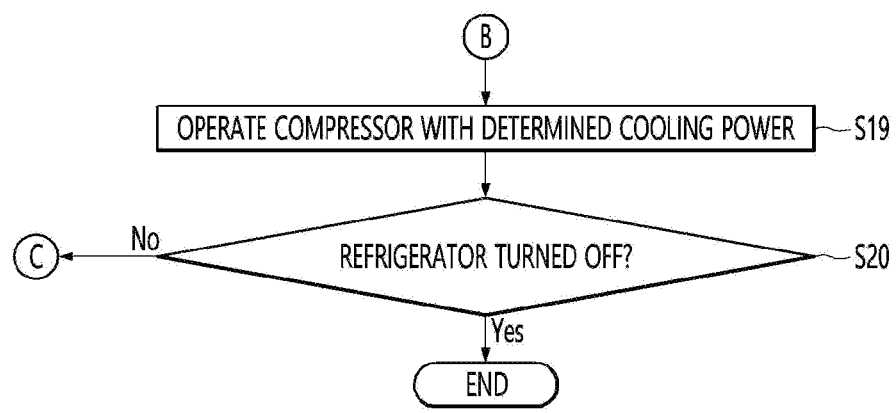

FIGS. 3 to 5 are flowcharts illustrating a method of controlling a refrigerator according to a first embodiment of the present disclosure.

Figure 6:
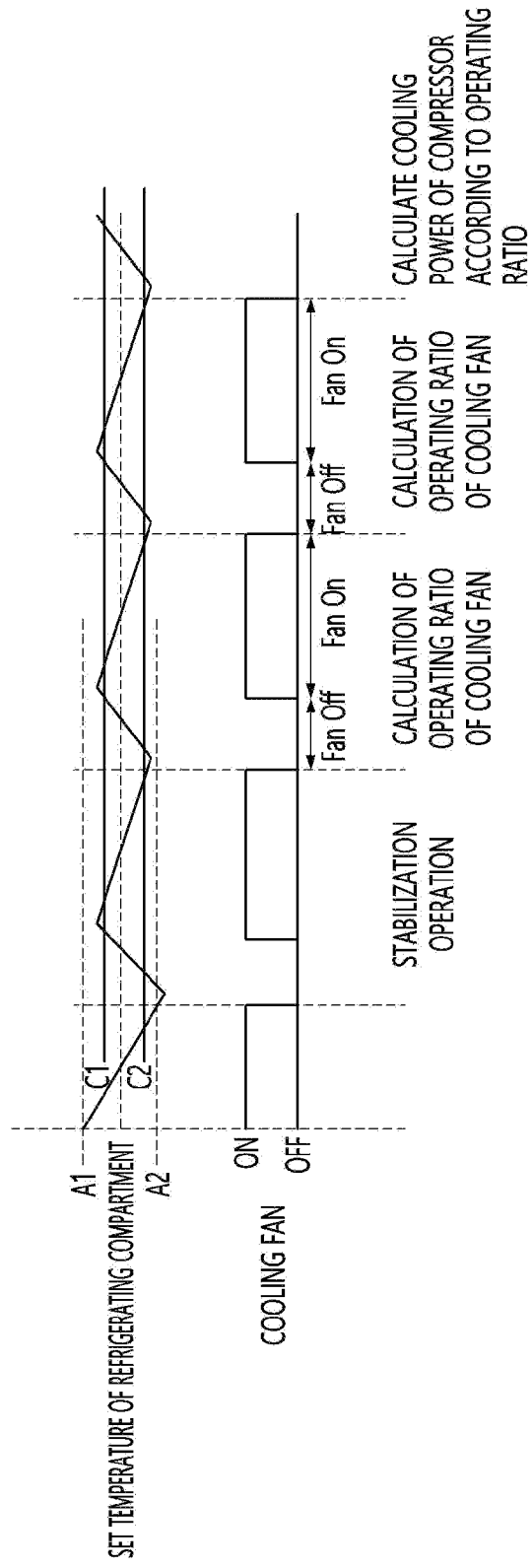
FIG. 6 is a view showing a temperature change of a refrigerating compartment and an operation state of a cooling fan over time.
Figure 7:
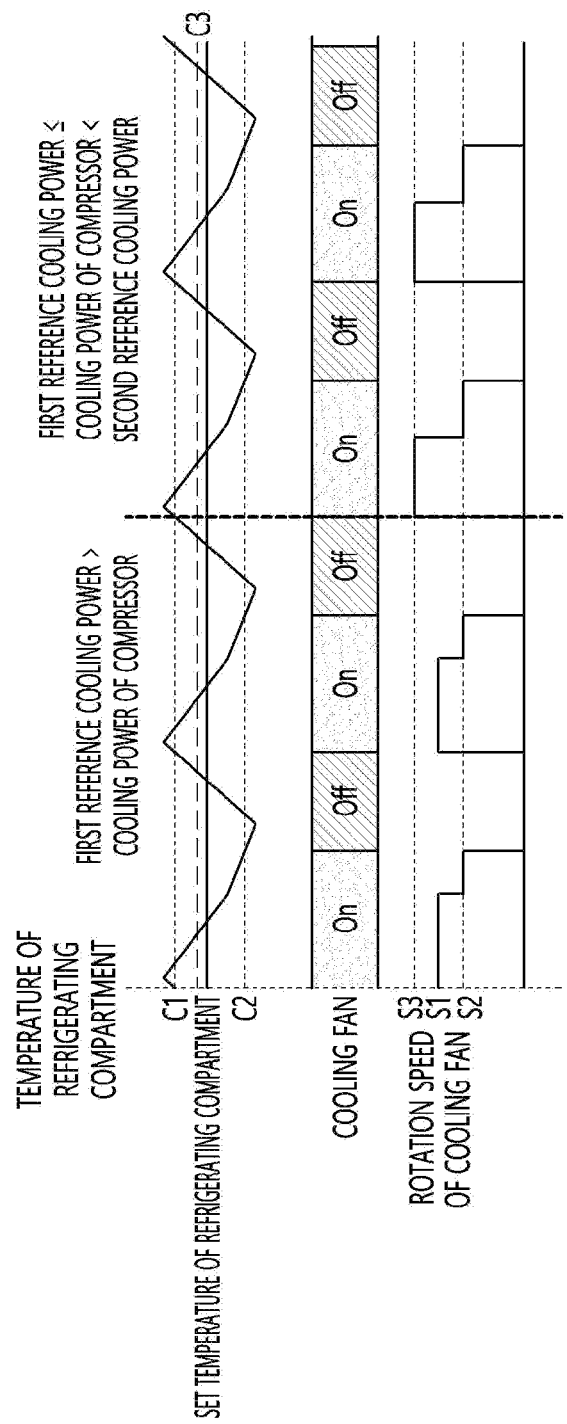
FIGS. 7 and 8 are views showing the rotation speed of the cooling fan according to cooling power of a compressor.
Figure 8:
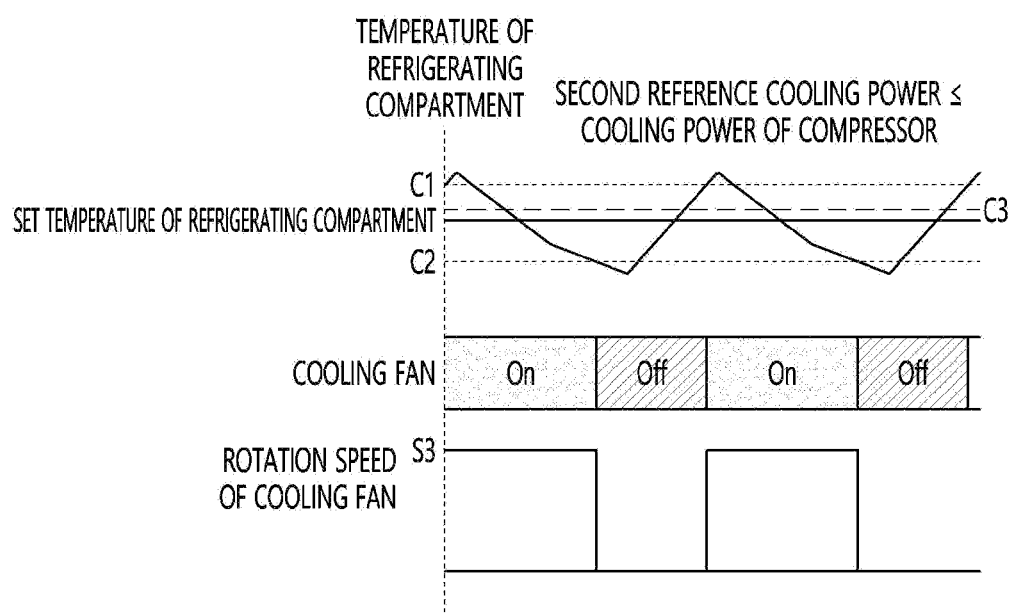

FIG. 6 is a view showing a temperature change of a refrigerating compartment and an operation state of a cooling fan over time, and FIGS. 7 and 8 are views showing the rotation speed of the cooling fan according to cooling power of a compressor.

Referring to FIGS. 2 to 7, the controller 50 may perform preliminary operation for constant temperature control when the refrigerator 1 is turned on (S1) (or opening and closing of a door are detected). In the present embodiment, the preliminary operation may be operation of rapidly reducing the temperature of the refrigerating compartment 112.

For example, the controller 50 may perform control such that the compressor 21 operates with cooling power and the cooling fan 26 operates at a set speed (S2).

In the present disclosure, the compressor 21 may be turned on when the temperature of the refrigerating compartment 112 is equal to or greater than the upper limit temperature A1 (or an ON reference temperature).

Generally, when the refrigerator 1 is turned on or the compressor 21 is turned on in a state in which the refrigerator 1 is turned off, the cold air generator is turned off for defrost or the door is open and closed, the temperature of the refrigerating compartment 112 may be higher than the upper limit temperature A1 (or the ON reference temperature).

Accordingly, the set cooling power of the compressor 21 may be, for example, maximum cooling power or power close to the maximum cooling power, such that the temperature of the refrigerating compartment 112 rapidly drops. In addition, the set speed of the cooling fan 26 may be, for example, a maximum speed or a speed close to the maximum speed.

When the compressor 21 and the cooling fan 26 operate, the temperature of the refrigerating compartment 112 decreases.

The controller 50 may determine whether the temperature of the refrigerating compartment 112 becomes equal to or less than the lower limit temperature A2 (or a change reference temperature) for example (S3).

Upon determining that the temperature of the refrigerating compartment 112 reaches the lower limit temperature A2 in step S3, the controller 50 may perform control to perform temperature stabilization operation. That is, the controller 50 may perform control to perform temperature stabilization operation after the preliminary operation is completed (S4 to S6).

The temperature stabilization operation means operation of allowing the temperature of the refrigerating compartment 112 to enter the temperature satisfaction range.

For example, the controller 50 may operate the compressor 21 with reference cooling power (S4).

The reference cooling power may be cooling power between maximum and minimum cooling power of the compressor 21. For example, the reference cooling power may be less than intermediate cooling power between the maximum and minimum cooling power of the compressor 21.

In addition, the controller 50 may perform control such that the cooling fan 26 is turned off or the cooling fan 26 operates at a limited speed (S4).

The limited speed may be, for example, a minimum speed (greater than 0) of the cooling fan 26 or a speed close to the minimum speed.

When the cooling fan 26 operates at the limited speed, the temperature of the refrigerating compartment 112 may increase. That is, the amount of cold air supplied to the refrigerating compartment 112 when the cooling fan 26 operates at the limited speed may be less than the amount of cold air supplied to the refrigerating compartment 112 when the cooling fan 26 operates at the set speed, and thus the temperature of the refrigerating compartment 112 may increase.

The controller 50 may determine whether the temperature of the refrigerating compartment 112 is equal to or greater than the first reference temperature C1 during operation of the compressor 21 (S5).

Upon determining that the temperature of the refrigerating compartment 112 is equal to or greater than the first reference temperature C1 in step S5, the controller 50 may operate the cooling fan at a first reference speed in a state in which the compressor 21 operates (S6).

In the present embodiment, the first reference speed may be greater than the limited speed.

For example, when the cooling fan 26 operates at the first reference speed, the first reference speed may be set to decrease the temperature of the refrigerating compartment 112.

That is, the amount of cold air supplied to the refrigerating compartment 112 when the cooling fan 26 operates at the first reference speed may be greater than the amount of cold air supplied to the refrigerating compartment 112 when the cooling fan 26 operates at the limited speed, and thus the temperature of the refrigerating compartment 112 may decrease.

The controller 50 may determine whether the temperature of the refrigerating compartment 112 is equal to or less than the second reference temperature C2 (S7).

Upon determining that the temperature of the refrigerating compartment 112 is equal to or less than the second reference temperature C2 in step S7, the controller 50 may perform control to perform constant temperature operation.

The controller 50 may perform control to repeat operation of turning off and then turning on the cooling fan 26 in the constant temperature operation step.

In the present disclosure, a period from when the cooling fan 26 is turned on after being turned off to when the cooling fan is turned off again may be referred to as one operating period.

Upon determining that the temperature of the refrigerating compartment 112 is equal to or less than the second reference temperature C2 in step S7, the controller 50 turns off the cooling fan 26 in a state in which operation of the compressor 21 is maintained (S8).

When the cooling fan 26 is turned off, the temperature of the refrigerating compartment 112 may increase.

While the temperature of the refrigerating compartment 112 increases, the controller 50 may determine whether the temperature of the refrigerating compartment 112 is equal to or greater than the first reference temperature C1 (S9).

Upon determining that the temperature of the refrigerating compartment 112 is equal to or greater than the first reference temperature C1 in step S9, the controller 50 may turn on the cooling fan 26 and control the cooling fan 26 such that the cooling fan 26 operates at a second reference speed (S10).

In step S10, when the cooling fan 26 operates at the second reference speed, the temperature of the refrigerating compartment 112 may decrease. The second reference speed may be equal to or different from the first reference speed.

While the cooling fan 26 operates at the second reference speed, the controller 50 may determine whether the temperature of the refrigerating compartment 112 is equal to or less than the second reference temperature (S11).

Upon determining that the temperature of the refrigerating compartment 112 becomes equal to or less than the second reference temperature C2 in step S11, the controller 50 may calculate the operating ratio of the cooling fan 26 based on the ON time and OFF time of the cooling fan 26 in steps S8 to S10 (S12). The calculated operating ratio of the cooling fan 26 may be stored in the memory 44.

In addition, upon determining that the temperature of the refrigerating compartment 112 becomes equal to or less than the second reference temperature C2 in step S11, the controller 50 may turn off the cooling fan 26 in a state in which operation of the compressor 21 is maintained (S13). When the cooling fan 26 is turned off, the temperature of the refrigerating compartment 112 may increase.

In a state in which the cooling fan 26 is turned off, the controller 50 may determine whether the temperature of the refrigerating compartment 112 becomes equal to or greater than the first reference temperature C1 (S14).

Upon determining that the temperature of the refrigerating compartment 112 becomes equal to or greater than the first reference temperature C1 in step S14, the controller 50 may determine the rotation speed of the cooling fan 26 and operate the cooling fan 26 at the determined rotation speed (S15).

For example, while the compressor 21 operates with the reference cooling power, the cooling fan 26 may operate at the second reference speed. That is, while the compressor 21 does not operate with the cooling power determined based on the cooling fan 26, the cooling fan 26 may operate at the second reference speed.

In the present embodiment, during two operating periods after the refrigerator 1 is turned on and the preliminary operation is performed, the cooling power of the compressor 21 is not determined based on the operating ratio of the cooling fan 26 and is determined as the reference cooling power. Accordingly, the cooling fan 26 may operate at the second reference speed until the second operating period. From a third operating period, the cooling power of the compressor 21 may be determined based on the operating ratio of the cooling fan 26.

In contrast, after the third operating period, while the compressor 21 operates with the cooling power determined based on the operating ratio of the cooling fan 26, the rotation speed of the cooling fan 26 may be determined based on the cooling power of the compressor 26.

When the cooling fan 26 operates at the determined speed in step S15, the temperature of the refrigerating compartment 112 may decrease.

While the cooling fan 26 operates at the determined speed, the controller 50 may determine whether the temperature of the refrigerating compartment 112 becomes equal to or less than the second reference temperature C2 (S16).

Upon determining that the temperature of the refrigerating compartment 112 becomes equal to or less than the second reference temperature C2 in step S16, the controller 50 may calculate the operating ratio of the cooling fan 26 based on the ON time and OFF time of the cooling fan 26 in steps S13 to S15 (S17). The calculated operating ratio of the cooling fan 26 may be stored in the memory 44.

That is, in the memory 44, the operating ratio of the cooling fan 26 may be calculated and stored for each operating period.

For convenience of description, the operating ratio calculated in step S12 may be referred to as a previous operating ratio and the operating ratio calculated in step S17 may be referred to as a current operating ratio.

When the current operating ratio is calculated, the controller 50 may compare the previous operating ratio with the current operating ratio and determine the cooling power of the compressor 21 (S18).

The controller 50 may operate the compressor 21 with the determined cooling power (S19).

That is, the controller 50 may operate the compressor 21 with the determined cooling power in a next operating period.

At this time, the cooling power changing time point of the compressor 21 may be a point of time when the cooling fan 26 is turned on or off.

As shown in FIG. 7, if a first operating period is finished when the cooling fan 26 is turned off, the operating ratio of the cooling fan 26 may be determined when the cooling fan 26 is turned off, and thus the cooling power of the compressor 21 may also be determined when the cooling fan 26 is turned off. In this case, the cooling power of the compressor 21 may be changed at the OFF time of the cooling fan 26 or after the OFF time of the cooling fan 26.

Alternatively, if the first operating period is finished when the cooling fan 26 is turned on, the operating ratio of the cooling fan 26 may be determined when the cooling fan 26 is turned on, and thus the cooling power of the compressor 21 may also be determined when the cooling fan 26 is turned on. In this case, the cooling power of the compressor 21 may be changed at the ON time of the cooling fan 26 or after the ON time of the cooling fan 26.

The controller 5 may continuously perform constant temperature operation of changing the cooling power of the compressor 21 in a state in which the compressor 21 is turned on, unless the refrigerator is turned off (S20).

For example, when the compressor 21 operates with the determined cooling power, the controller 50 may repeatedly perform steps S13 to S19.

When steps S13 to S19 are repeatedly performed, the operating ratio of the cooling fan 26 is calculated for each operating period, the last calculated operating ratio becomes a current operating ratio and the previously calculated operating ration becomes a previous operating ratio.

In addition, in the constant temperature operating process, when the cooling power of the compressor 21 is determined for each operating period, the rotation speed of the cooling fan 26 may be determined based on the determined cooling power of the compressor 21.

In the present embodiment, the controller 50 may determine the cooling power of the compressor 21 based on a difference between the previous operating ratio and current operating ratio of the cooling fan 26.

For example, when the absolute value of the difference between the previous operating ratio and current operating ratio of the cooling fan 26 is less than a first reference value, the controller 50 may maintain the cooling power of the compressor 21 at the current cooling power. That is, the controller 50 may not change the cooling power of the compressor 21.

Alternatively, when the absolute value of the difference between the previous operating ratio and current operating ratio of the cooling fan 26 is equal to or greater than the first reference value, the cooling power of the compressor 21 may increase or decrease.

For example, when the difference between the previous operating ratio and current operating ratio is less than 0 and the absolute value of the difference between the previous operating ratio and current operating ratio is equal to or greater than the first reference value, the cooling power of the compressor 21 may increase by a first level.

The difference between the previous operating ratio and current operating ratio being less than 0 may mean that the current operating ratio is greater than the previous operating ratio.

The current operating ratio being greater than the previous operating ratio means that the operating time of the cooling fan 26 increases. Increasing the operating time of the cooling fan 26 means that a time required for the temperature of the refrigerating compartment 112 to increase from the first reference temperature C1 to reach the second reference temperature C2 increases.

When the cooling power of the compressor 21 is low, the temperature of cold air supplied to the refrigerating compartment 112 may be relatively high.

When the temperature of the cold air actually supplied to the refrigerating compartment 112 is higher than the temperature of cold air suitable for the current load of the refrigerating compartment 112 (the required temperature of cold air), a time required for the temperature of the refrigerating compartment 112 to increase from the first reference temperature C1 to reach the second reference temperature C2 may increase.

Accordingly, in the present embodiment, when the difference between the previous operating ratio and the current operating ratio is less than 0 and the absolute value of the difference between the previous operating ratio and the current operating ratio is equal to or greater than the first reference value, the cooling power of the compressor 21 may increase by the first level.

Alternatively, when the difference between the previous operating ratio and the current operating ratio is greater than 0 and the absolute value of the difference between the previous operating ratio and the current operating ratio is equal to or greater than the first reference value, the cooling power of the compressor 21 may decrease by the first level.

The difference between the previous operating ratio and the current operating ratio being greater than 0 means that the current operating ratio is less than the previous operating ratio.

The current operating ratio being less than the previous operating ratio means that the operating time of the cooling fan 26 decreases. Decreasing the operating time the cooling fan 26 means that a time required for the temperature of the refrigerating compartment 112 to increase from the first reference temperature C1 to reach the second reference temperature C2 decreases.

When the cooling power of the compressor 21 is high, the temperature of cold air supplied to the refrigerating compartment 112 may be relatively low.

When the temperature of the cold air actually supplied to the refrigerating compartment 112 is lower than the temperature of cold air suitable for the current load of the refrigerating compartment 112 (the required temperature of cold air), a time required for the temperature of the refrigerating compartment 112 to increase from the first reference temperature C1 to reach the second reference temperature C2 may decrease.

Accordingly, in the present embodiment, when the difference between the previous operating ratio and the current operating ratio is greater than 0 and the absolute value of the difference between the previous operating ratio and the current operating ratio is equal to or greater than the first reference value, the cooling power of the compressor 21 may decrease by the first level.

In the present embodiment, a plurality of reference values for comparison with the absolute value of the difference between the previous operating ratio and the current operating ratio may be set.

For example, when the difference between the previous operating ratio and the current operating ratio is less than 0 and the absolute value of the difference between the previous operating ratio and the current operating ratio is equal to or greater than a second reference value greater the first reference value, the cooling power of the compressor 21 may increase by a second level.

In addition, when the absolute value of the difference between the previous operating ratio and the current operating ratio is equal to or greater than a third reference value greater than the second reference value, the cooling power of the compressor 21 may increase by a third level. Alternatively, when the absolute value of the difference between the previous operating ratio and the current operating ratio is equal to or greater than the third reference value greater than the second reference value, the cooling power of the compressor 21 may be determined as maximum cooling power.

Alternatively, when the difference between the previous operating ratio and the current operating ratio is greater than 0 and the absolute value of the difference between the previous operating ratio and the current operating ratio is equal to or greater than the second reference value greater than the first reference value, the cooling power of the compressor 21 may decrease by the second level.

In addition, when the absolute value of the difference between the previous operating ratio and the current operating ratio is equal to or greater than the third reference value greater than the second reference value, the cooling power of the compressor 21 may decrease by a third level. Alternatively, when the absolute value of the difference between the previous operating ratio and the current operating ratio is equal to or greater than the third reference value greater than the second reference value, the cooling power of the compressor 21 may be determined as minimum cooling power.

At this time, the differences between the plurality of reference values may be equally or differently determined. For example, the first reference value may be set to B1, the second reference value may be set to 2*B1, and the third reference value may be set to 3*B1. Alternatively, the first reference value may be set to B2, the second reference value may be set to C*B2, and the third reference value may be set to C1*B2. At this time, C1 may have a value greater than C.

In addition, the differences between the plurality of levels may be equally or differently set. For example, the first level may be set to have a cooling power change value of D, the second level may be set to have a cooling power change value of 2*D, and the third level may be set to have a cooling power change value of 3*D.

Alternatively, the first level may be set to have a cooling power change value of D, the second level may be set to have a cooling power change value of D1 (greater than D) instead of 2*D, and the third level may be set to have a cooling power change value of D2 (greater than D1) instead of 3*D.

Hereinafter, a method of determining the rotation speed of the cooling fan 26 based on the cooling power of the compressor 21 will be described.

Referring to FIGS. 7 and 8, when the cooling power of the compressor 21 is less than first reference cooling power, the rotation speed of the cooling fan 26 may be determined as a first rotation speed S1.

In a state in which the cooling fan 26 is turned on, the cooling fan 26 may rotate at the determined first rotation speed S1.

For example, the cooling fan 26 may rotate at the first rotation speed S1 until being turned off. That is, the rotation speed of the cooling fan 26 may be constantly maintained.

In another example, the rotation speed of the cooling fan 26 may be changed once or more from ON to OFF. The rotation speed of the cooling fan 26 may decrease before being turned off.

For example, when the cooling power of the compressor 21 is less than the first reference cooling power, the cooling fan 26 may rotate at the first rotation speed S1 and, before the cooling fan 26 is turned off, the rotation speed of the cooling fan 26 may be changed to a second rotation speed S2 slower than the first rotation speed S1.

The reason why the rotation speed of the cooling fan 26 at the beginning of the ON time is high and the rotation speed of the cooling fan when the cooling fan is turned off is low is as follows.

In a state in which the cooling fan 26 is turned off, the temperature of the refrigerating compartment 112 rises and then the temperature of the refrigerating compartment 112 reaches the first reference temperature C1. At this time, even if the cooling fan 26 is turned on, the temperature of the refrigerating compartment 112 may be likely to increase to a temperature higher than the first reference temperature C1 by inertia of rising temperature.

When the temperature of the refrigerating compartment 112 becomes higher than the first reference temperature C1, a temperature change range of the object to be stored increases.

Accordingly, the rotation speed of the cooling fan 26 is high at the beginning of the ON time, thereby rapidly decreasing the temperature of the refrigerating compartment 112 higher than the first reference temperature C1 to the first reference temperature or less.

On the other hand, in a state in which the cooling fan 26 is turned on, the temperature of the refrigerating compartment 112 drops. Even if the temperature of the refrigerating compartment 112 reaches the second reference temperature C2 and thus the cooling fan 26 is turned off, the temperature of the refrigerating compartment 112 may be likely to decrease to a temperature lower than the second reference temperature C2 by inertia of falling temperature.

Since the falling rate of the temperature of the refrigerating compartment 112 increases as the rotation speed of the cooling fan 26 increases, the rotation speed of the cooling fan 26 may decrease before being turned off and the falling rate of the temperature of the refrigerating compartment 112 may decrease.

Then, in a state in which the cooling fan 26 is turned off, it is possible to reduce the likelihood that the temperature of the refrigerating compartment 112 decreases to the temperature lower than the second reference temperature C2. Alternatively, even if the temperature of the refrigerating compartment 112 becomes lower than the second reference temperature C2, it is possible to minimize a difference between the temperature (lowest temperature) of the refrigerating compartment 112 and the second reference temperature C2.

In the present embodiment, when the rotation speed of the cooling fan 26 is changed, the change time of the rotation speed may be determined based on one or more of the ON time of the cooling fan 26 and the temperature of the refrigerating compartment 112.

For example, when a first set time elapses while the cooling fan 26 is turned on and rotated at the first rotation speed S1, the cooling fan 26 may rotate at the second rotation speed S2.

In another example, when the temperature of the refrigerating compartment 112 is equal to or less than a third reference temperature C3 between the first reference temperature C1 and the second reference temperature C2 while the cooling fan 26 is turned on and rotated at the first rotation speed S1, the cooling fan 26 may rotate at the second rotation speed S2.

The third reference temperature C3 may be closer to the set temperature than the first reference temperature C1 or the second reference temperature C2.

Although not limited, the third reference temperature C3 may be a temperature between the first reference temperature C1 and the set temperature.

In another example, when the first set time has elapsed and the temperature of the refrigerating compartment 112 becomes equal to or less than the third reference temperature C3 while the cooling fan 26 is turned on and rotated at the first rotation speed S1, the cooling fan 26 may rotate at the second rotation speed S2.

When the cooling fan 26 operates at the first rotation speed S1, even if the temperature of the refrigerating compartment 112 becomes equal to or less than the third reference temperature C3, if the ON time of the cooling fan 26 does not elapse the first set time, the cooling fan 26 may rotate at the first rotation speed S1. In this case, when the ON time of the cooling fan 26 reaches the first set time, the rotation speed of the cooling fan 26 may be changed to the second rotation speed S2.

In addition, when the cooling fan 26 operates at the first rotation speed S1, even if the ON time of the cooling fan 26 elapses the first set time, until the temperature of the refrigerating compartment 112 becomes equal to or less than the third reference temperature C3, the cooling fan 26 may continuously rotate at the first rotation speed S1. In this case, when the temperature of the refrigerating compartment 112 becomes equal to or less than the third reference temperature C3, the rotation speed of the cooling fan 26 may be changed to the second rotation speed S2.

When the cooling power of the compressor 21 is equal to or greater than the first reference cooling power and is less than the second reference cooling power greater than the first reference cooling power, the rotation speed of the cooling fan 26 may be determined as a third rotation speed S3. The third rotation speed S3 is higher than the first rotation speed S1.

When the cooling power of the compressor 21 is high, this means that the load of the temperature of the refrigerating compartment 112 is large. Therefore, by increasing the rotation speed of the cooling fan 26, it is possible to rapidly decrease the load of the temperature of the refrigerating compartment 112.

For example, the cooling fan 26 may rotate at the third rotation speed S3 until being turned off. That is, the rotation speed of the cooling fan 26 may be constantly maintained.

In another example, the rotation speed of the cooling fan 26 may change once or more from ON to OFF. The rotation speed of the cooling fan 26 may decrease before the cooling fan is turned off.

For example, when the cooling power of the compressor 21 is equal to or greater than the first reference cooling power and is less than the second reference cooling power greater than the first reference cooling power, the cooling fan 26 may rotate at the third rotation speed S3 and, before the cooling fan 26 is turned off, the rotation speed of the cooling fan 26 may be changed to the second rotation speed S2 lower than the third rotation speed S3. Alternatively, the rotation speed of the cooling fan 26 may be changed from the third rotation speed S3 to a fourth rotation speed different from the second rotation speed S2. The reason why the rotation speed of the cooling fan 26 is changed has been described above.

In the present embodiment, when the cooling fan 26 rotates at the third rotation speed S3, the change time of the rotation speed of the cooling fan 26 may be determined based on one or more of the ON time of the cooling fan 26 and the temperature of the refrigerating compartment 112.

For example, when a second set time elapses while the cooling fan 26 is turned on and rotated at the third rotation speed S3, the cooling fan 26 may rotate at the second rotation speed S2. The second set time may be different from the first set time. The length of the second set time may be less than that of the first set time.

In another example, when the temperature of the refrigerating compartment 112 becomes equal to or less than the third reference temperature C3 while the cooling fan 26 is turned on and rotated at the third rotation speed S3, the cooling fan 26 may rotate at the second rotation speed S2.

In another example, when the second set time has elapsed and the temperature of the refrigerating compartment 112 becomes equal to or less than the third reference temperature C3 while the cooling fan 26 is turned on and rotated at the third rotation speed S3, the cooling fan 26 may rotate at the second rotation speed S2.

When the cooling fan 26 operates at the third rotation speed S3, even if the temperature of the refrigerating compartment 112 becomes equal to or less than the third reference temperature C3, if the ON time of the cooling fan 26 does not elapse the second set time, the cooling fan 26 may rotate at the third rotation speed S3. In this case, when the ON time of the cooling fan 26 reaches the second set time, the rotation speed of the cooling fan 26 may be changed to the second rotation speed S2.

In addition, when the cooling fan 26 operates at the third rotation speed S3, even if the ON time of the cooling fan 26 elapses the second set time, until the temperature of the refrigerating compartment 112 becomes equal to or less than the third reference temperature C3, the cooling fan 26 may continuously rotate at the third rotation speed S1. In this case, when the temperature of the refrigerating compartment 112 becomes equal to or less than the third reference temperature C3, the rotation speed of the cooling fan 26 may be changed to the second rotation speed S2.

When the cooling power of the compressor 21 is equal to or greater than the second reference cooling power, the rotation speed of the cooling fan 26 may be determined as the third rotation speed S3.

For example, in a state in which the door of the refrigerator is open, after the defrost operation has ended, or when heat having a temperature higher than that of the refrigerating compartment 112 is provided to the refrigerating compartment 112, the cooling power of the compressor 21 may be equal to or greater than the second reference cooling power.

In this case, since the temperature load of the refrigerating compartment 112 is large, it is necessary to rapidly decrease the temperature of the refrigerating compartment 112.

Accordingly, when the cooling power of the compressor 21 is equal to or greater than the second reference cooling power, for example, the cooling fan 26 may rotate at the third rotation speed S3 until being turned off. That is, the rotation speed of the cooling fan 26 is not changed.

The third rotation speed may be a maximum speed or a speed lower than the maximum speed.

In another example, when the third rotation speed is lower than the maximum speed, if the cooling power of the compressor 21 is equal to or greater than the second reference cooling power, the cooling fan 26 may rotate at a fourth rotation speed which is the maximum speed.

In the present embodiment, in the constant-temperature operating step, the compressor 21 operates with the previously determined cooling power.

When one operating period is completed, the current operating ratio of the cooling fan 26 may be acquired, the cooling power of the compressor 21 which will operate in a next operating period may be determined, and the compressor 21 may operate with the determined cooling power.

In addition, when the cooling power of the compressor 21 is determined, the rotation speed of the cooling fan 26 is determined and the cooling fan 26 rotates at the determined rotation speed.

In the present disclosure, any one of the freezing compartment 111 and the refrigerating compartment 112 may be referred to as a first storage compartment and the other thereof may be referred to as a second storage compartment.

When a temperature sensor is present in the freezing compartment 111, ON and OFF of the cooling fan 26 may be determined according to the temperature change of the freezing compartment 111. In this case, the cooling power of the compressor 21 may be determined based on the operating ratio of the cooling fan 26.

According to the present embodiment, since the cooling power of the compressor 21 may be changed according to the result of comparing the previous operating ratio and the current operating ratio of the cooling fan 26, in a state in which the compressor 21 is not turned off, the cooling power of the compressor 21 may be adjusted, thereby preventing power consumption from increasing due to repeated ON/OFF of the compressor 21.

The cooling power of the compressor 21 may converge to specific cooling power in the constant-temperature operating process or may operate with cooling power similar to the specific cooling power. The specific cooling power of the compressor 21 refers to cooling power for actually maintaining the temperature of the refrigerating compartment 112 in the temperature satisfaction range and may be less than the intermediate cooling power of the compressor 21.

Accordingly, even if the compressor 21 continuously operates, since the cooling power of the compressor 21 is maintained at relatively lower cooling power than the intermediate cooling power, it is possible to minimize increase in power consumption of the compressor 21.

Since the temperature of the refrigerating compartment 112 is maintained in the temperature satisfaction range, the temperature change range of the object to be stored, which is stored in the refrigerating compartment 112, may be minimized and freshness of the object to be stored may be maintained.

In addition, since the cooling power of the compressor 21 may be adjusted to a plurality of levels, when the temperature of the refrigerating compartment 112 rapidly increases or decreases (for example, when the door is opened, when the door is opened and cold air having a temperature lower than the temperature of the refrigerating compartment 112 is supplied to the refrigerating compartment 112 or when air outside the refrigerator is supplied to the refrigerating compartment 112), the temperature of the refrigerating compartment 112 may be rapidly returned to the temperature satisfaction range.

In addition, since the rotation speed of the cooling fan 26 is determined based on the cooling power of the compressor 21, the case where the temperature of the refrigerating compartment 112 is out of the temperature satisfaction range may be minimized and, when the temperature of the refrigerating compartment 112 is out of the temperature satisfaction range, it is possible to rapidly return the temperature of the refrigerating compartment 112 to the temperature satisfaction range.

In the present embodiment, when the cooling power of the compressor 21 is determined based on the operating ratio of the cooling fan 26, the following effects may be obtained as compared to the case where the cooling power of the compressor 21 is determined based on the operating ratio of the compressor 21.

First, in the present embodiment, since ON and OFF of the compressor 21 are not repeated, it is possible to prevent power consumption from significantly increasing when the compressor 21 is turned on. In addition, it is possible to prevent noise occurring when the compressor 21 is switched from OFF to ON. In addition, by reducing the number of times of turning on and off the compressor, the possibility of malfunction of the compressor 21 may be reduced.

A modified example of the first embodiment will be described.

Although, in the above embodiment, the cooling power of the compressor 21 is determined based on the previous operating ratio and the current operating ratio of the cooling fan 26, the cooling power of the compressor 21 may be determined by the result of comparing the current operating ratio of the cooling fan 26 with a predetermined reference operating ratio. The reference operating ratio may be stored in the memory 44.

In this case, in the method of controlling the refrigerator of FIGS. 3 to 5, steps S13 to S17 may be omitted. In addition, step S18 may be changed to step of changing the cooling power of the compressor 21 by the result of comparing the current operating ratio with the predetermined reference operating ratio.

In addition, unless the refrigerator is turned off after step S19, the method may move to step S8 of FIG. 3 and the constant-temperature operation may be repeatedly performed.

That is, in the constant-temperature operating step, when the current operating ratio of the cooling fan 26 is calculated, the cooling power of the compressor 21 is determined by the result of comparison with the reference operating ratio stored in the memory 44 and the compressor 21 may operate with the determined cooling power in a next operating period.

For example, when the absolute value of the difference between the reference operating ratio and the current operating ratio is less than the first reference value, the controller 50 may maintain the cooling power of the compressor 21 at the current cooling power. That is, the controller 50 does not change the cooling power of the compressor 21.

Alternatively, when the absolute value of the difference between the reference operating ratio and the current operating ratio is equal to or greater than the first reference value, the cooling power of the compressor 21 may increase or decrease.

For example, when the difference between the reference operating ratio and the current operating ratio is less than 0 and the absolute value of the difference between the previous operating ratio and the current operating ratio is equal to or greater than the first reference value, the cooling power of the compressor 21 may increase by the first level.

The reference operating ratio may be experimentally determined to maintain the refrigerating compartment 112 in the temperature satisfaction range the compressor 21 operates with cooling power less than the intermediate cooling power without external influence in a state in which the door of the refrigerating compartment 112 is closed. The reference operating ratio may not be changed in a state of being stored in the memory 44 or may be changed according to the type of the refrigerator or an outdoor environment (outdoor temperature).

Alternatively, when the difference between the reference operating ratio and the current operating ratio is greater than 0 and the absolute value of the difference between the reference operating ratio and the current operating ratio is equal to or greater than the first reference value, the cooling power of the compressor 21 may decrease by the first level.

In the present embodiment, a plurality of reference values for comparison with the absolute value of the difference between the reference operating ratio and the current operating ratio may be set.

For example, when the difference between the reference operating ratio and the current operating ratio is less than 0 and the absolute value of the difference between the reference operating ratio and the current operating ratio is equal to or grater than the second reference value greater than the first reference value, the cooling power of the compressor 21 may increase by the second level.

In addition, when the absolute value of the difference between the reference operating ratio and the current operating ratio is equal to or greater than the third reference value greater than the second reference value, the cooling power of the compressor 21 may increase by the third level.

Alternatively, when the difference between the reference operating ratio and the current operating ratio is greater than 0 and the absolute value of the difference between the reference operating ratio and the current operating ratio is equal to or greater than the second reference value greater than the first reference value, the cooling power of the compressor 21 may decrease by the second level.

In addition, when the absolute value of the difference between the reference operating ratio and the current operating ratio is equal to or greater than the third reference value greater than the second reference value, the cooling power of the compressor 21 may decrease by the third level.

At this time, differences between the plurality of reference values may be equally or differently set. For example, the first reference value may be set to E1, the second reference value may be set to 2*E1, and the third reference value may be set to 3*E1. Alternatively, the first reference value may be set to E2, the second reference value may be set to F*E2, and the third reference value may be set to F1*E2. At this time, F1 may have a greater value than F.

In addition, differences between the plurality of levels may be equally or differently set. For example, the first level may be set to have a cooling power change value of G, the second level may be set to have a cooling power change value of 2*G and the third level may be set to have a cooling power change value of 3*G.

Alternatively, the first level may be set to have a cooling power change value of G1, the second level may be set to have a cooling power change value of G2 (greater than G1) instead of 2*G1, and the third level may be set to have a cooling power change value of G3 (greater than G2) instead of 3*G1.

Accordingly, according to the present embodiment, since the cooling power of the compressor 21 may be changed based on the result of comparing the reference operating ratio with the current operating ratio of the cooling fan 26, in a state in which the compressor 21 is not turned off, the cooling power of the compressor 21 may be adjusted, thereby preventing increase in power consumption according to repeated ON/OFF of the compressor 21.

Another modified example of the first embodiment will be described.

The controller 50 may maintain the cooling power of the compressor 21 in the current state or may increase or decrease the cooling power of the compressor 21, based on a first factor (the difference between the previous operating ratio and the current operating ratio) and a second factor (the difference between the reference operating ratio and the current operating ratio) for adjusting the cooling power of the compressor 21.

In this modified example, steps S1 to S20 described in the first embodiment may be equally performed.

The controller 50 may determine whether the cooling power of the compressor 21 is increased, maintained or decreased based on the first factor, determine whether the cooling power of the compressor 21 is increased, maintained or decreased based on the second factor, and then finally determine whether the cooling power of the compressor 21 is increased, maintained or decreased based on a combination of the results.

For example, upon determining that the cooling power of the compressor 21 is maintained based on the first factor and determining that the cooling power of the compressor 21 is increased based on the second factor, the cooling power of the compressor 21 is finally increased.

Upon determining that the cooling power of the compressor 21 is maintained based on the first factor and determining that the cooling power of the compressor 21 is decreased based on the second factor, the cooling power of the compressor 21 is finally decreased.

Upon determining that the cooling power of the compressor 21 is maintained based on the first factor and the second factor, the cooling power of the compressor 21 is finally maintained.

Upon determining that the cooling power of the compressor 21 is increased based on the first factor and determining that the cooling power of the compressor 21 is maintained based on the second factor, the cooling power of the compressor 21 is finally increased.

Upon determining that the cooling power of the compressor 21 is decreased based on the first factor and determining that the cooling power of the compressor 21 is maintained based on the second factor, the cooling power of the compressor 21 is finally decreased.

Upon determining that the cooling power of the compressor 21 is increased based on the first factor and the second factor, the cooling power of the compressor 21 is finally increased.

Upon determining that the cooling power of the compressor 21 is decreased based on the first factor and the second factor, the cooling power of the compressor 21 is finally decreased.

Upon determining that the cooling power of the compressor 21 is decreased based on the first factor and determining that the cooling power of the compressor 21 is increased based on the second factor, the cooling power of the compressor 21 may be maintained, increased or decreased according to the level of the cooling power determined as being decreased based on the first factor and the level of the cooling power determined as being increased based on the second factor.

Upon determining that the cooling power of the compressor 21 is increased based on the first factor and determining that the cooling power of the compressor 21 is decreased based on the second factor, the cooling power of the compressor 21 may be maintained, increased or decreased according to the level of the cooling power determined as being increased based on the first factor and the level of the cooling power determined as being decreased based on the second factor.

Figure 9:
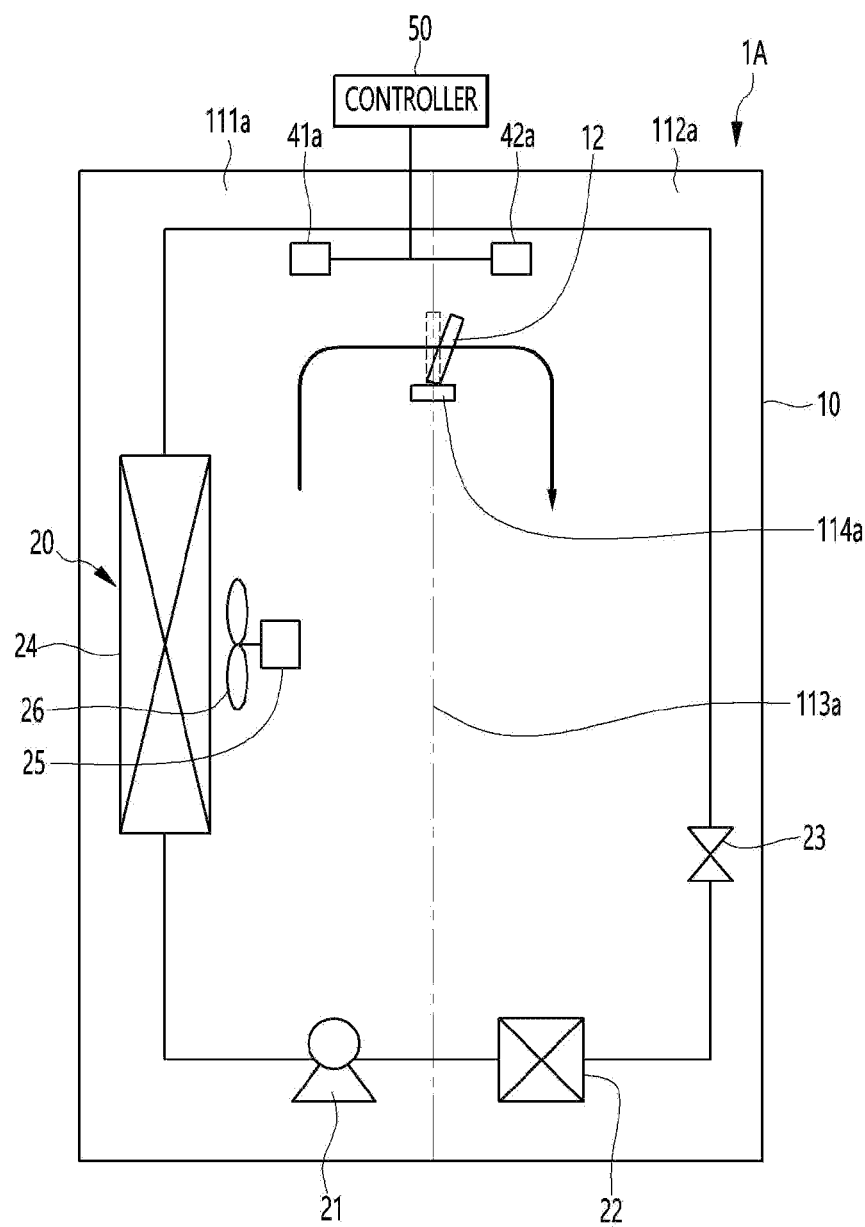
FIG. 9 is a view schematically showing the configuration of a refrigerator according to a second embodiment of the present disclosure.

FIG. 9 is a view schematically showing the configuration of a refrigerator according to a second embodiment of the present disclosure.

Referring to FIG. 9, the refrigerator 1A according to the second embodiment of the present disclosure may include a cabinet 10, in which a freezing compartment 111a and a refrigerating compartment 112a are formed, and doors (not shown) coupled to the cabinet 10 to open and close the freezing compartment 111a and the refrigerating compartment 112a.

The freezing compartment 111a and the refrigerating compartment 112a may be horizontally or vertically partitioned by a partitioning wall 113a in the cabinet 10. A cold air hole may be formed in the partitioning wall 113a, and a damper 12 may be installed in the cold air hole to open or close the cold air hole.

The refrigerator 1A may further include a freezing cycle 20 for cooling the freezing compartment 111a and/or the refrigerating compartment 112a.

The freezing cycle 20 may be equal to that of the first embodiment and thus a detailed description thereof will be omitted.

In the freezing cycle 20, the evaporator 24 may include a freezing compartment evaporator.

The refrigerator 1A may include a cooling fan 26 for enabling air to flow toward the evaporator 24 for cold air circulation of the freezing compartment 111a, and a fan driving unit 25 for driving the cooling fan 26.

In the present embodiment, the compressor 21 and the cooling fan 26 need to operate to supply cold air to the freezing compartment 111a, and the compressor 21 and the cooling fan 26 need to operate and the damper 12 needs to be open to supply cold air to the refrigerating compartment 112a. At this time, the damper 12 may operate by a damper motor 114a.

The compressor 21, the cooling fan 26 (or the fan driving unit 25) and the damper 12 (or the damper motor 114a) may be referred to as a "cooling unit" which operates to cool the storage compartment. The cooling unit may include one or more of a cold air generator and a cold air transmission unit (cold air transmission unit).

In the present embodiment, the compressor 21 may be called a cold air generator and the cooling fan 26 and the damper 12 may be called a cold air transmission unit.

In the present disclosure, the cooling power of the cold air generator may mean the cooling power of the compressor 21 and the output of the cold air transmission unit may mean the rotation speed of the cooling fan 26 and/or the opening angle of the damper 12.

When the cold air transmission unit is the cooling fan 26, the operating ratio of the cooling fan 26 may mean a ratio of an ON time to a sum of the ON time and the OFF time of the cooling fan 26 in one ON/OFF period of the cooling fan 26.

In the present embodiment, a state in which the damper 12 is closed is defined as a state in which the cold air transmission unit is turned off and a state in which the damper 12 is open is defined as a state in which the cold air transmission unit is turned on.

When the cold air transmission unit is the damper 12, the operating ratio of the damper may mean a ratio of the opening time of the damper 12 to a sum of one closing time of the damper 12 and one opening time of the damper 12.

The refrigerator 1A may further include a freezing compartment temperature sensor 41a for detecting the temperature of the freezing compartment 111a, a freezing compartment temperature sensor 42a for detecting the temperature of the refrigerating compartment 112a, and a controller 50 for controlling the cold air generator based on the temperatures detected by the temperature sensors 41a and 42a.

The controller 50 may control one or more of the compressor 21 and the cooling fan 26 such that the temperature of the freezing compartment 111a is maintained at a set temperature (or a target temperature).

For example, the cooling power of the compressor 21 may be controlled based on the operating ratio of the cooling fan 26 using the same method as the control method described in the first embodiment.

The controller 50 may control the output of one or more of the compressor 21, the cooling fan 26 and the damper 12 in order to maintain the temperature of the refrigerating compartment 112a at the set temperature.

For example, the cooling power of the compressor 21 may be controlled based on the operating ratio of the damper 12 according to the same pattern as the control method described in the first embodiment.

For example, when the refrigerator 1A is turned on, the controller 50 may perform preliminary operation for constant temperature control. For example, the controller 50 may perform control such that the compressor 21 operates with set cooling power and the cooling fan 26 operates at a set speed. In addition, the controller 50 may perform control such that the damper 12 is opened at a set angle.

The set cooling power of the compressor 21 may be, for example, maximum cooling power or cooling power close to the maximum cooling power, such that the temperature of the refrigerating compartment 112a rapidly drops. In addition, the set speed of the cooling fan 26 may be, for example, a maximum speed or a speed close to the maximum speed. In addition, the opening angle of the damper 12 may be a maximum angle or an angle close to the maximum angle.

When the compressor 21 and the cooling fan 26 operate and the damper 12 is opened at the set angle, the temperature of the refrigerating compartment 112a drops.

Upon determining that the temperature of the refrigerating compartment 112a reaches the lower limit temperature A2, the controller 50 may perform control to perform the temperature stabilization operation.

For example, the controller 50 may perform control such that the compressor 21 operates with the reference cooling power. The reference cooling power may be less than the intermediate cooling power between the maximum cooling power and the minimum cooling power of the compressor 21.

In addition, the controller 50 may change the opening angle of the damper 12 such that the damper 12 is closed or the opening angle of the damper 12 becomes a limited angle. The limited angle may be equal to or greater than the minimum angle of the damper 12, for example.

When the damper 12 is closed or the opening angle of the damper 12 is adjusted to the limited angle, the temperature of the refrigerating compartment 112 may increase.

The controller 50 may determine whether the temperature of the refrigerating compartment 112a is equal to or greater than the first reference temperature while the compressor 21 operates.

When the temperature of the refrigerating compartment 112 is equal to or greater than the first reference temperature, the controller 50 may set the opening angle of the damper 12 to a first reference angle in a state in which the compressor 21 operates.

In the present embodiment, the first reference angle may be greater than the limited angle.

For example, when the damper 12 is opened at the first reference angle, the first reference angle may be set to decrease the temperature of the refrigerating compartment 112a.

Since the amount of cold air supplied to the refrigerating compartment 112a when the damper 12 is opened at the first reference angle is greater than that of cold air supplied to the refrigerating compartment 112a when the damper 12 is opened at the limited angle, the temperature of the refrigerating compartment 112a may decrease.

The first reference angle may be a fixed angle. Alternatively, the first reference angle may be changed once or more.

When the first reference angle is changed once or more, the first reference angle may be changed from the first angle to the second angle less than the first angle.

When the damper 12 is opened at a first angle, the amount of cold air supplied to the refrigerating compartment 112a is large and thus the temperature decreasing speed of the refrigerating compartment 112a may increase.

After the temperature of the refrigerating compartment 112a decreases to some extent, the opening angle of the damper 12 may decrease to a second angle, thereby reducing the temperature decreasing speed of the refrigerating compartment 112a. In this case, it is possible to reduce the temperature change range of the refrigerating compartment 112a per unit time.

At this time, a time when the opening angle of the damper 12 is changed from the first angle to the second angle may be determined by a time or based on the temperature of the refrigerating compartment 112a.

For example, when the damper 12 is opened at a first angle and a set time has elapsed, the damper 12 may be opened at a second angle.

Alternatively, in a state in which the damper 12 is opened at the first angle, when the temperature of the refrigerating compartment 112a reaches a third reference temperature between the first reference temperature and the second reference temperature, the damper 12 may be opened at the second angle.

When the temperature of the refrigerating compartment 112 is equal to or less than the second reference temperature, the controller 50 may perform control to perform constant-temperature operation.

The controller 50 may perform control to repeat operation of closing and then opening the damper 12 in the constant-temperature operating step.

In the present embodiment, a period in which the damper 12 is closed, opened and closed again may be referred to as one operating period.

The controller 50 may calculate the operating ratio of the damper 12 for each operating period in two operating periods in the constant-temperature operating step and determine the cooling power of the compressor 21 based on the calculated two operating ratios. The controller 50 may operate the compressor 21 with the determined cooling power in a next operating period.

When the temperature of the refrigerating compartment 112 is equal to or less than the second reference temperature, the controller 50 performs control to close the damper 12 in a state in which operation of the compressor 21 is maintained.

When the damper 12 is closed, the temperature of the refrigerating compartment 112a may increase. The controller 50 may perform control to open the damper 12 at a second reference angle, upon determining that the temperature of the refrigerating compartment 112a is equal to or greater than the first reference temperature.

When the damper 12 is opened at the second reference angle, the temperature of the refrigerating compartment 112a may drop.

The second reference angle may be equal to or different from the first reference angle.

The second reference angle may be fixed or changed once or more like the first reference angle. Change in second reference angle may be equal to change in the first reference angle and thus a detailed description thereof will be omitted.

In a state in which the damper 12 is opened at the second reference angle, upon determining that the temperature of the refrigerating compartment 112a becomes equal to or less than the second reference temperature, the controller 50 may calculate the operating ratio of the damper 12 based on the closing time and opening time of the damper 12. The calculated operating ratio of the damper 12 may be stored in the memory 44.

Upon determining that the temperature of the refrigerating compartment 112a becomes equal to or less than the second reference temperature, the controller 50 may perform control to close the damper 12 in a state of maintaining operation of the compressor 21.

When the damper 12 is closed, the temperature of the refrigerating compartment 112a may increase. In a state in which the damper 12 is closed, upon determining that the temperature of the refrigerating compartment 112a becomes equal to or greater than the first reference temperature, the controller 50 may perform control such that the damper 12 is opened at a third reference angle. When the damper 12 is opened at the third reference angle, the temperature of the refrigerating compartment 112a may drop.

The third reference angle may be equal to one or more of the first reference angle and the second reference angle or may be different from the first reference angle and the second reference angle.

The third reference angle may be fixed or changed once or more like the first reference angle. Change in third reference angle may be equal to change in the first reference angle and thus a detailed description thereof will be omitted.

In a state in which the damper 12 is opened at the third reference angle, upon determining that the temperature of the refrigerating compartment 112a becomes equal to or less than the second reference temperature, the controller 50 may calculate the operating ratio of the damper 12 based on the closing time and opening time of the damper 12. The calculated operating ratio of the damper 12 may be stored in the memory 44.

That is, the operating ratio of the damper 12 may be calculated for each operating period and stored in the memory 44.

When the current operating ratio is calculated, the controller 50 may compare the previous operating ratio with the current operating ratio and determine the cooling power of the compressor 21. The controller 50 may operate the compressor 21 with the determined cooling power.

That is, the controller 50 may perform control such that the compressor 21 operates with the determined cooling power in a next operating period.

As described in the first embodiment, the controller 50 may compare the previous operating ratio with the current operating ratio and determine the cooling power of the compressor 21.

In another example, the controller 50 may compare the reference operating ratio of the damper 12 with the current operating ratio and determine the cooling power of the compressor 21.

In another example, the controller 50 may maintain the cooling power of the compressor 21 in the current state or may increase or decrease the cooling power of the compressor 21, based on a first factor (the difference between the previous operating ratio and the current operating ratio) and a second factor (the difference between the reference operating ratio and the current operating ratio) for adjusting the cooling power of the compressor 21. The method of determining the cooling power of the compressor 21 based on the first factor and the second factor is equal to that described in the first embodiment and thus a detailed description thereof will be omitted.

In addition, by the method equal to that described in the first embodiment, the opening angle of the damper 12 may be determined based on the cooling power of the compressor 21.

According to the cooling power of the compressor 21, the opening angle of the damper 12 may be changed once or more before the damper 12 is closed or may be constantly maintained.

Figure 10:
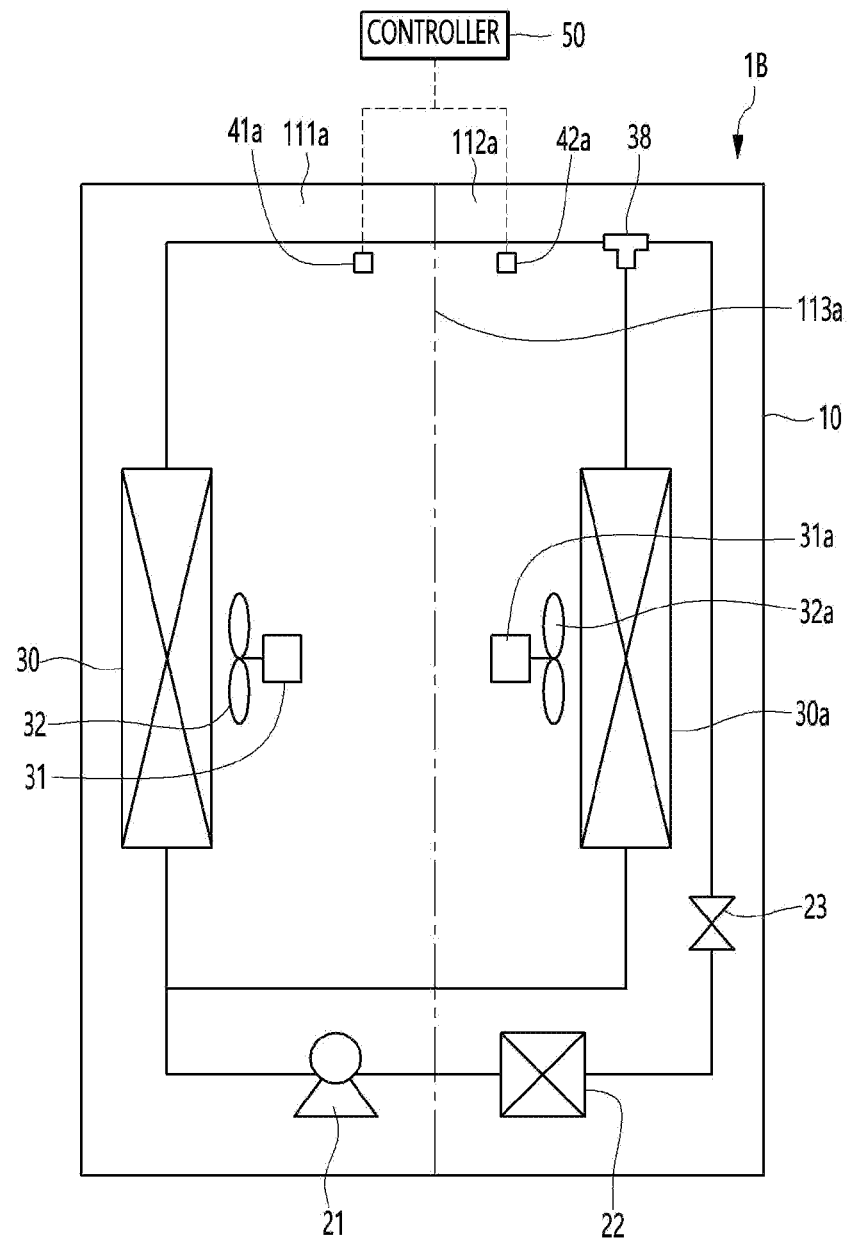
FIG. 10 is a view schematically showing the configuration of a refrigerator according to a third embodiment of the present disclosure.

FIG. 10 is a view schematically showing the configuration of a refrigerator according to a third embodiment of the present disclosure.

Referring to FIG. 10, the refrigerator 1B according to the third embodiment of the present disclosure may include a cabinet 10, in which a freezing compartment 111a and a refrigerating compartment 112b are formed, and doors (not shown) coupled to the cabinet 10 to open and close the freezing compartment 111a and the refrigerating compartment 112a.

The freezing compartment 111a and the refrigerating compartment 112a may be horizontally or vertically partitioned by a partitioning wall 113a in the cabinet 10.

The refrigerator 1B may further include a condenser 22, an expansion member 23, a freezing compartment evaporator 30 (or a first evaporator) for cooling the freezing compartment 111a and a refrigerating compartment evaporator 30a (or a second evaporator) for cooling the refrigerating compartment 112a.

The refrigerator 1B may include a switch valve 38 for enabling the refrigerant, which has passed through the expansion member 23, to flow to any one of the freezing compartment evaporator 30 and the refrigerating compartment evaporator 30a.

In the present embodiment, a state in which the switch valve 38 operates such that the refrigerant flows to the freezing compartment evaporator 30 may be referred to as a first state. In addition, a state in which the switch valve 38 operates such that the refrigerant flows to the refrigerating compartment evaporator 30a may be referred to as a second state. The switch valve 38 may be a three-way valve, for example.

The switch valve 38 may selectively open any one of a first refrigerant passage connected such that refrigerant flows between the compressor 21 and the refrigerating compartment evaporator 30a and a second refrigerant passage connected such that refrigerant flows between the compressor 21 and the freezing compartment evaporator 30. By the switch valve 38, cooling of the refrigerating compartment 112a and cooling of the freezing compartment 111a may be alternately performed.

The refrigerator 1B may include a freezing compartment fan 32 (which may be referred to as a first fan) for blowing air to the freezing compartment evaporator 30, a first motor 31 for rotating the freezing compartment fan 32, a refrigerating compartment fan 32a (which may be referred to as a second fan) for blowing air to the refrigerating compartment evaporator 30a and a second motor 31a for rotating the refrigerating compartment fan 32a.

In the present embodiment, a series of cycles in which refrigerant flows through the compressor 21, the condenser 22, the expansion member 23 and the freezing compartment evaporator 30 may be referred to as a "freezing cycle" and a series of cycles in which refrigerant flows through the compressor 21, the condenser 22, the expansion member 23 and the refrigerating compartment evaporator 30a may be referred to as a "refrigerating cycle".

"Operation of the refrigerating cycle" mean that the compressor 21 is turned on, the refrigerating compartment fan 32a is rotated, and the refrigerant flowing through the refrigerating compartment evaporator 30a exchanges heat with air while the refrigerant flows through the refrigerating compartment evaporator 30a by the switch valve 38.

"Operation of the freezing cycle" mean that the compressor 21 is turned on, the freezing compartment fan 32 is rotated, the refrigerant flowing through the freezing compartment evaporator 30 exchanges heat with air while the refrigerant flows through the freezing compartment evaporator 30 by the switch valve 38.

Although one expansion member 23 is located at the upstream side of the switch valve 38 in the above description, a first expansion member is provided between the switch valve 38 and the freezing compartment evaporator 30, and a second expansion member is provided between the switch valve 38 and the refrigerating compartment evaporator 30a.

In another example, the switch valve 38 may not be used, a first valve may be provided at the inlet side of the freezing compartment evaporator 30, and a second valve may be provided at the inlet side of the refrigerating compartment evaporator 30a. The first valve may be turned on and the second valve may be turned off during operation of the freezing cycle and the first valve may be turned off and the second valve may be turned on during operation of the refrigerating cycle.

The refrigerating compartment fan and the compressor may be referred to as a first cooling unit for cooling a first storage compartment and the freezing compartment fan may be referred to as a second cooling unit for cooling a second storage compartment.

The refrigerator 1B may include a freezing compartment temperature sensor 41a for detecting the temperature of the freezing compartment 111a, a refrigerating compartment temperature sensor 42a for detecting the temperature of the refrigerating compartment 112a, an input unit (not shown) for inputting the respective target temperatures (or set temperatures) of the freezing compartment 111a and the refrigerating compartment 112a, and a controller 50 for controlling a cooling cycle (including the freezing cycle and the refrigerating cycle) based on the input target temperatures and the temperatures detected by the temperature sensors 41a and 42a.

In addition, in the present disclosure, a temperature higher than the set temperature of the refrigerating compartment 112a may be referred to as a first refrigerating compartment reference temperature and a temperature lower than the set temperature of the refrigerating compartment 112a may be referred to as a second refrigerating compartment reference temperature. In addition, a range between the first refrigerating compartment reference temperature and the second refrigerating compartment reference temperature may be referred to as a refrigerating compartment set temperature range.

In the present disclosure, a temperature higher than the set temperature of the freezing compartment 111a is referred to as a first freezing compartment reference temperature, and a temperature lower than the set temperature of the freezing compartment 111a may be a second freezing compartment reference temperature. In addition, a range between the first freezing compartment reference temperature and the second freezing compartment reference temperature may be referred to as a freezing compartment set temperature range.

In the present embodiment, a user may set the respective target temperatures of the freezing compartment 111a and the refrigerating compartment 112a.

In the present embodiment, the controller 50 may perform control such that a refrigerating cycle, a freezing cycle and a pump-down cycle configure one operating period. That is, the controller 50 may operate the cycle while continuously operating the compressor 21 without stopping.

In the present embodiment, the pump-down operation means operation of operating the compressor 21 to collect refrigerant remaining in each evaporator in the compressor 21 in a state in which supply of the refrigerant to all a plurality of evaporators is prevented.

The controller 50 operates the refrigerating cycle, and operates the freezing cycle when the stop condition of the refrigerating cycle is satisfied. When the stop condition of the freezing cycle is satisfied while the freezing cycle operates, the pump-down operation may be performed. When the pump-down operation is completed, the refrigerating cycle may operate again.

In the present embodiment, when the stop condition of the refrigerating cycle is satisfied, cooling of the refrigerating compartment may be regarded as being completed. In addition, when the stop condition of the freezing cycle is satisfied, cooling of the freezing compartment may be regarded as being completed.

At this time, in the present disclosure, the stop condition of the refrigerating cycle may be the start condition of the freezing cycle.

In the present embodiment the pump-down operation may be omitted under a special condition. In this case, the refrigerating cycle and the freezing cycle may alternately operate. The refrigerating cycle and the freezing cycle may configure one operating period.

In one operating period, the operating ratio of the refrigerating compartment fan 32a may be determined.

For example, in one operating period, when the refrigerating cycle operates, the refrigerating compartment fan 32a may be turned on, and, when the freezing cycle operates, the refrigerating compartment fan 32a may be turned off. Accordingly, the operating ratio of the refrigerating compartment fan 32a which is a ratio of the ON time of the refrigerating compartment fan 32a to a sum of the ON time and OFF time of the refrigerating compartment fan 32a may be determined.

The controller 50 may determine the cooling power of the compressor 21 during operation of the refrigerating cycle based on the determined operating ratio of the refrigerating compartment fan 32a.

As described above in the first embodiment, the controller 50 may compare the previous operating ratio of the refrigerating compartment fan 32a with the current operating ratio of the refrigerating compartment fan 32a and determine the cooling power of the compressor 21 during operation of the refrigerating cycle.

In another example, the controller 50 may compare the reference operating ratio of the refrigerating compartment fan 32a with the current operating ratio of the refrigerating compartment fan 32a and determine the cooling power of the compressor 21 during operation of the refrigerating cycle.

In another example, the controller 50 may maintain the cooling power of the compressor 21 in the current state or may increase or decrease the cooling power of the compressor 21, based on a first factor (the difference between the previous operating ratio of the refrigerating compartment fan and the current operating ratio of the refrigerating compartment fan) and a second factor (the difference between the reference operating ratio and the current operating ratio of the refrigerating compartment fan) for adjusting the cooling power of the compressor 21.

In addition, in one operating period, the operating ratio of the freezing compartment fan 32 may be determined.

For example, in one operating period, when the freezing cycle operates, the freezing compartment fan 32 may be turned on, and, when the refrigerating cycle operates, the freezing compartment fan 32 may be turned off. Accordingly, the operating ratio of the freezing compartment fan 32 which is a ratio of the ON time of the freezing compartment fan 32 to a sum of the ON time and OFF time of the freezing compartment fan 32 may be determined.

The controller 50 may determine the cooling power of the compressor 21 during the freezing cycle based on the determined operating ratio of the freezing compartment fan 32.

As described above in the first embodiment, the controller 50 may compare the previous operating ratio of the freezing compartment fan 32 with the current operating ratio of the freezing compartment fan 32 and determine the cooling power of the compressor 21 during operation of the freezing cycle.

In another example, the controller 50 may compare the reference operating ratio of the freezing compartment fan 32 with the current operating ratio of the freezing compartment fan 32 and determine the cooling power of the compressor 21 during operation of the freezing cycle.

In another example, the controller 50 may maintain the cooling power of the compressor 21 in the current state or may increase or decrease the cooling power of the compressor 21, based on a first factor (the difference between the previous operating ratio of the freezing compartment fan and the current operating ratio of the freezing compartment fan) and a second factor (the difference between the reference operating ratio and the current operating ratio of the freezing compartment fan) for adjusting the cooling power of the compressor 21.

In addition, by the method equal to that described in the first embodiment, the rotation speed of the freezing compartment fan 32 and/or the rotation speed of the refrigerating compartment fan 32a may be determined based on the cooling power of the compressor 21.

In addition, the rotation speed of the freezing compartment fan 32 and/or the refrigerating compartment fan 32a may be changed once or more before the freezing compartment fan 32 and/or the refrigerating compartment fan 32a are turned off or may be constantly maintained according to the cooling power of the compressor 21.

Figure 11:
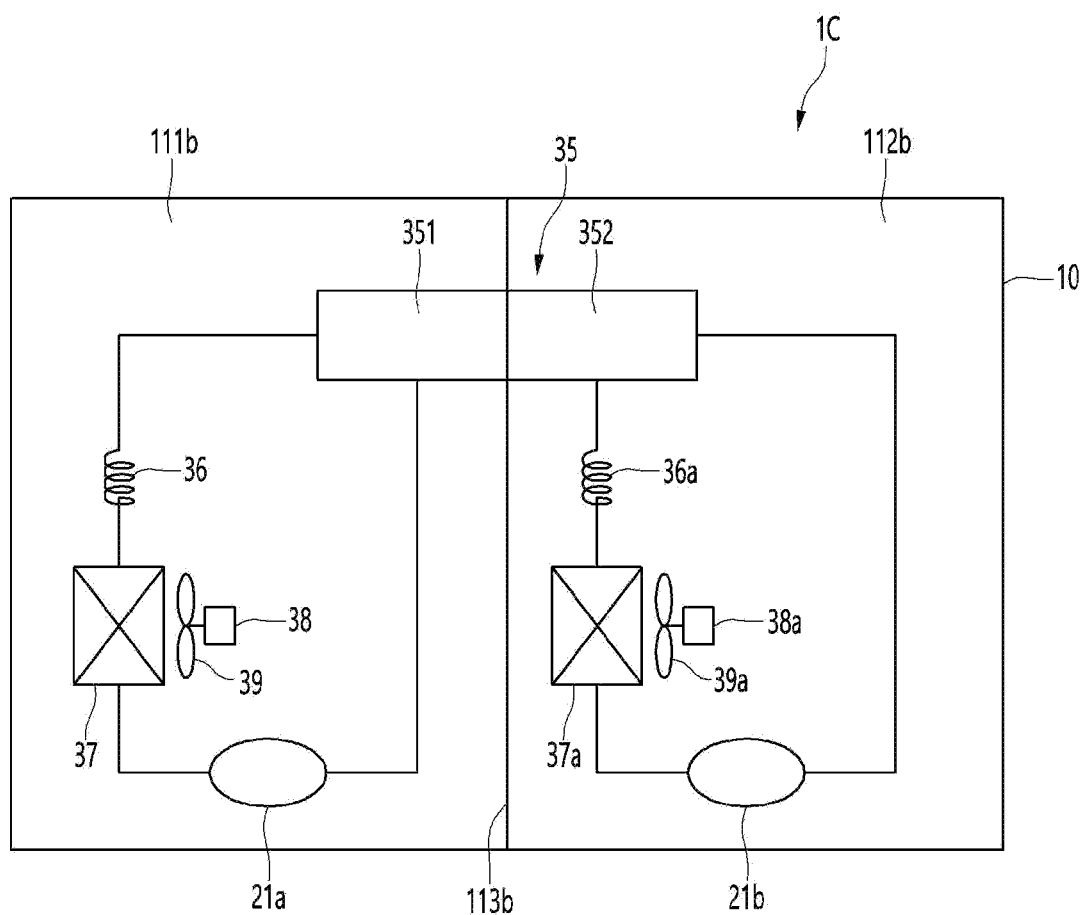
FIG. 11 is a view schematically showing the configuration of a refrigerator according to a fourth embodiment of the present disclosure.

FIG. 11 is a view schematically showing the configuration of a refrigerator according to a fourth embodiment of the present disclosure.

Referring to FIG. 11, the refrigerator 1C according to the fourth embodiment of the present disclosure may include a cabinet 10, in which a freezing compartment 111b and a refrigerating compartment 112b are formed, and doors (not shown) coupled to the cabinet 10 to open and close the freezing compartment 111b and the refrigerating compartment 112b.

The freezing compartment 111b and the refrigerating compartment 112b may be horizontally or vertically partitioned by a partitioning wall 113b in the cabinet 10.

In addition, the refrigerator 1C may include a cooling cycle for cooling the freezing compartment 111b and the refrigerating compartment 112b.

The cooling cycle may include a freezing cycle for cooling the freezing compartment 111b and a refrigerating cycle for cooling the refrigerating compartment 112b.

The refrigerating cycle may include a freezing compartment compressor 21a (or a first compressor), a condenser 35, a first expansion member 36, a first evaporator 37 and a freezing compartment fan 39.

The freezing compartment fan 39 may rotate by a first motor 38. The freezing compartment fan 39 may blow air toward the first evaporator 37 for cold air circulation of the freezing compartment 111b.

In the present embodiment, the freezing compartment compressor 21a and the freezing compartment fan 39 may be referred to as a "freezing compartment cooling unit" for cooling the freezing compartment 111b.

The refrigerating cycle may include a refrigerating compartment compressor 21b (or a second compressor), a condenser 35, a second expansion member 36a, a second evaporator 37a and a refrigerating compartment fan 39a.

The refrigerating compartment fan 39a may rotate by a second motor 38a. The refrigerating compartment fan 39a may blow air toward the second evaporator 37a for cold air circulation of the refrigerating compartment 112b.

In the present embodiment, the refrigerating compartment compressor 21b and the refrigerating compartment fan 39a may be referred to as a "refrigerating compartment cooling unit" which operates to cool the refrigerating compartment 112b.

At this time, the condenser 35 configures one heat exchanger and is divided into two parts such that refrigerant flows. That is, refrigerant discharged from the first compressor 21a may flow to a first part 351 of the condenser 35 and refrigerant discharged from the second compressor 21b may flow to a second part 352 of the condenser 35. A condenser pin for the first part 351 and a condenser pin for the second part 352 may be connected to increase condensation efficiency of the condenser.

Compared to the case where two separate condensers are installed in a machine room, it is possible to increase the condensing efficiency of the condenser while reducing the installation space of the condenser. Accordingly, the first part 351 may be referred to as a first condenser and the second part 352 may be referred to as a second condenser.

The refrigerator 1C may further include a controller for controlling the cooling cycle based on the temperatures of the freezing compartment 111b and/or the refrigerating compartment 112b input through an input unit (not shown) and the temperatures detected by a freezing compartment temperature sensor and/or a refrigerating compartment temperature sensor (not shown).

In the present embodiment, a temperature higher than the target temperature of the freezing compartment 111b is referred to as a first freezing compartment reference temperature, and a temperature lower than the target temperature of the freezing compartment 111b may be referred to as a second freezing compartment reference temperature. In addition, a range between the first freezing compartment reference temperature and the second freezing compartment reference temperature may be referred to as a freezing compartment set temperature range.

In the present embodiment, the controller performs control such that the temperature of the freezing compartment 111b is maintained in the set temperature range. At this time, control to maintain the temperature of the freezing compartment 111b in the set temperature range is referred to as constant temperature control of the freezing compartment.

In addition, in the present embodiment, a temperature higher than the target temperature of the refrigerating compartment 112b is referred to as a first refrigerating compartment reference temperature, and a temperature lower than the target temperature of the refrigerating compartment 112b may be referred to as a second refrigerating compartment reference temperature. In addition, a range between the first refrigerating compartment reference temperature and the second refrigerating compartment reference temperature may be referred to as a refrigerating compartment set temperature range.

In the present embodiment, the controller performs control such that the temperature of the refrigerating compartment 112b is maintained in the set temperature range. At this time, control to maintain the temperature of the refrigerating compartment 112b in the set temperature range is referred to as constant temperature control of the refrigerating compartment.

The cooling cycle for the freezing compartment 111b and the refrigerating compartment 112b may configure respective cooling cycles such that the cooling units independently operate according to the first reference temperature and the second reference temperature of the freezing compartment 111b and the first reference temperature and the second reference temperature of the refrigerating compartment 112b.

For example, the refrigerating cycle may stop, and the freezing cycle may operate for constant temperature control of the freezing compartment 111b. For constant temperature control of the freezing compartment 111b, the freezing compartment compressor 21a and the freezing compartment fan 39 may operate.

When the refrigerating cycle operates, the temperature of the freezing compartment 111b drops. In contrast, in a state in which the refrigerating cycle is stopped, the temperature of the refrigerating compartment 112b rises.

During operation of the refrigerating cycle, upon determining that the detected temperature of the refrigerating compartment reaches the first refrigerating compartment reference temperature, the controller operates the refrigerating cycle. That is, in order to reduce the temperature of the refrigerating compartment 112b, the controller operates the refrigerating compartment compressor 21b and the refrigerating compartment fan 39a.

At least some periods in which the refrigerating cycle operates, the freezing compartment compressor 21a and the freezing compartment fan 39 may be turned off.

At least some periods in which the freezing cycle operates, the refrigerating compartment compressor 21b and the refrigerating compartment fan 39a may be turned off.

When the operation condition of the refrigerating cycle is satisfied during operation of the refrigerating cycle, the controller may operate the freezing cycle.

The freezing compartment fan 39 may be repeatedly turned on and off by repetition of operation of the refrigerating cycle and operation of the refrigerating cycle, and the refrigerating compartment fan 39a is also repeatedly turned on and off.

The controller may calculate the operating ratio of the freezing compartment fan 39 using the ON time and OFF time of the freezing compartment fan 39. In addition, the controller may calculate the operating ratio of the refrigerating compartment fan 39a using the ON time and OFF time of the refrigerating compartment fan 39a.

The controller may determine the cooling power of the freezing compartment compressor 21a during the freezing cycle based on the operating ratio of the freezing compartment fan 39.

As described above in the first embodiment, the controller may compare the previous operating ratio of the freezing compartment fan 39 with the current operating ratio of the freezing compartment fan 39 and determine the cooling power of the freezing compartment compressor 21a during operation of the refrigerating cycle.

In another example, the controller may compare the reference operating ratio of the freezing compartment fan 39 with the current operating ratio of the freezing compartment fan 39 and determine the cooling power of the compressor 21a during operation of the freezing cycle.

In another example, the controller may maintain the cooling power of the freezing compartment compressor 21a in the current state or may increase or decrease the cooling power of the freezing compartment compressor 21a, based on a first factor (the difference between the previous operating ratio of the freezing compartment fan and the current operating ratio of the freezing compartment fan) and a second factor (the difference between the reference operating ratio and the current operating ratio of the freezing compartment fan) for adjusting the cooling power of the freezing compartment compressor 21a.

The controller may determine the cooling power of the refrigerating compartment compressor 21b during operation of the refrigerating cycle based on the operating ratio of the refrigerating compartment fan 39a.

As described above in the first embodiment, the controller may compare the previous operating ratio of the refrigerating compartment fan 39a with the current operating ratio of the refrigerating compartment fan 39a and determine the cooling power of the refrigerating compartment compressor 21b during operation of the freezing cycle.

In another example, the controller may compare the reference operating ratio of the refrigerating compartment fan 39a with the current operating ratio of the refrigerating compartment fan 39a and determine the cooling power of the refrigerating compartment compressor 21b during operation of the freezing cycle.

In another example, the controller may maintain the cooling power of the refrigerating compartment compressor 21b in the current state or may increase or decrease the cooling power of the refrigerating compartment compressor 21b, based on a first factor (the difference between the previous operating ratio of the refrigerating compartment fan and the current operating ratio of the refrigerating compartment fan) and a second factor (the difference between the reference operating ratio and the current operating ratio of the refrigerating compartment fan) for adjusting the cooling power of the refrigerating compartment compressor 21b.

In addition, by the method equal to that described in the first embodiment, the rotation speed of the freezing compartment fan 39 may be determined based on the cooling power of the freezing compartment compressor 21a.

In addition, according to the cooling power of the freezing compartment compressor 21a, the rotation speed of the freezing compartment fan 39 may be changed once or more before the freezing compartment fan 39 is turned off or may be constantly maintained.

In addition, by the method equal to that described in the first embodiment, the rotation speed of the refrigerating compartment fan 39a may be determined based on the cooling power of the refrigerating compartment compressor 21b.

In addition, according to the cooling power of the refrigerating compartment compressor 21b, the rotation speed of the refrigerating compartment fan 39b may be changed once or more before the refrigerating compartment fan 39b is turned off or may be constantly maintained.

In the present disclosure, the speed of the cooling fan (including the refrigerating compartment fan and the freezing compartment fan) and the angle of the damper may be collectively referred to as output. For example, the reference speed of the cooling fan and the reference angle of the damper may be referred to as reference output. In addition, the set speed of the cooling fan may be referred to as set output of the cooling fan and the limited speed of the cooling fan may be referred to as the limited output of the cooling fan.

In addition, the rotation speed of the cooling fan (including the refrigerating compartment fan and the freezing compartment fan) and the opening angle of the damper may be referred to as operation output of the cold air transmission unit.

For example, the first rotation speed to third rotation speed of the cooling fan may be referred to as first operation output to third operation output of the cold air transmission unit.

The invention claimed is:

1. A method of controlling a refrigerator including a cold air generator to generate cold air for cooling a storage compartment and a cold air transmission unit to transmit the cold air to the storage compartment, the method comprising:

operating, by a controller of the refrigerator, the cold air generator and the cold air transmission unit when a temperature of the storage compartment is equal to or greater than a first reference temperature;

when the temperature of the storage compartment becomes equal to or less than a second reference temperature that is less than the first reference temperature while the operating the cold air generator and the cold air transmission unit, turning off, by the controller, the cold air transmission unit; and when the temperature of the storage compartment becomes equal to or greater than the first reference temperature after turning off the cold air transmission unit, turning on, by the controller, the cold air transmission unit again, wherein the controller determines an initial setting for an operation output of the cold air transmission unit based on a cooling power of the cold air generator, and wherein after turning on the cold air transmission unit again, the cold air transmission unit operates with the determined initial setting for the operation output, wherein the cold air generator includes a compressor, and wherein the cold air transmission unit includes a cooling fan operating to provide the cold air to the storage compartment, wherein the operation output for the cooling fan changes from the initial setting one or more times before the cooling fan is turned off again.

2. The method of claim 1, wherein, if the cooling power of the cold air generator is less than a first reference cooling power, the controller determines the initial setting for the operation output of the cold air transmission unit as a first operation output that is greater than a second operation output, and wherein, if the cooling power of the cold air generator is equal to or greater than the first reference cooling power, the controller determines the initial setting for the operation output of the cold air transmission unit as a third operation output that is greater than the first operation output.

3. The method of claim 2, wherein, after turning on the cold air transmission unit again, the first operation output or the third operation output for the cold air transmission unit changes from the initial setting one or more times before the cold air transmission unit is turned off again.

4. The method of claim 3, wherein, the cold air transmission unit changes from operating with the first operation output to operating with the second operation output that is less than the first operation output.

5. The method of claim 3, wherein, the cold air transmission unit changes from operating with the third operation output to operating with the second operation output that is less than the first operation output.

6. The method of claim 3, wherein a change time point of the operation output of the cold air transmission unit changing from the initial setting is determined based on one or more of an ON time of the cold air transmission unit or the temperature of the storage compartment.

7. The method of claim 6, wherein, when a set time has elapsed while the cold air transmission unit operates after being turned on again, the cold air transmission unit is changed from the initial setting.

8. The method of claim 6, wherein, when a first set time has elapsed while the cold air transmission unit operates with the first operation output after being turned on again, the operation output of the cold air transmission unit is changed, and wherein, when a second set time different from the first set time has elapsed while the cold air transmission unit operates with third operation output after being turned on again, the operation output of the cold air transmission unit is changed.

9. The method of claim 6, wherein, when the temperature of the storage compartment becomes equal to or less than a third reference temperature between the first reference temperature and the second reference temperature while the cold air transmission unit operates after being turned on again, the operation output of the cold air transmission unit is changed.

10. The method of claim 6, wherein, when a set time has elapsed and the temperature of the storage compartment becomes equal to or less than a third reference temperature between the first reference temperature and the second reference temperature while the cold air transmission unit operates after being turned on again, the operation output of the cold air transmission unit is changed.

11. The method of claim 3, wherein, if the cooling power of the cold air generator is equal to or greater than a second reference cooling power greater than the first reference cooling power, the controller determines the operation output of the cold air transmission unit as the third operation output and maintains the operation output of the cold air transmission unit at the third operation output until the cold air transmission unit is turned off.

12. The method of claim 1, wherein, after turning on the cold air transmission unit again, the operation output is changed from or maintained at the initial setting according to the cooling power of the cold air generator.

13. The method of claim 1, wherein the controller calculates an operating ratio of the cold air transmission unit based on an ON time of the cold air transmission unit and an OFF time of the cold air transmission unit, and determines the cooling power of the cold air generator based on the operating ratio of the cold air transmission unit.

14. A method of controlling a refrigerator including a cold air generator to generate cold air for cooling a storage compartment and a cold air transmission unit to transmit the cold air to the storage compartment, the method comprising:

when a temperature of the storage compartment becomes equal to or greater than a first reference temperature, operating, by a controller of the refrigerator, the cold air generator with a first cooling power and the cold air transmission unit with a first output; upon determining that the temperature of the storage compartment becomes equal to or less than a second reference temperature lower than the first reference temperature when operating the cold air generator and the cold air transmission unit, turning off, by the controller, the cold air transmission unit; and upon determining that the temperature of the storage compartment becomes equal to or greater than the first reference temperature after turning off the cold air transmission unit, operating, by the controller, the cold air generator with a second cooling power and the cold air transmission unit with a second output that is determined based on the second cooling power, wherein the cold air generator includes a compressor, wherein the cold air transmission unit includes a cooling fan operating to provide cold air to the storage compartment, wherein the first output includes a first rotational speed of the cooling fan and the second output includes a second rotational speed of the cooling fan, and wherein a rotational speed of the cooling fan changes from an initial setting one or more times before the cooling fan is turned off again.

15. A method of controlling a refrigerator including a compressor to generate cold air for cooling a storage compartment and a cooling fan to transmit the cold air to the storage compartment, the method comprising: when a temperature of the storage compartment becomes equal to or greater than a first reference temperature, operating, by a controller of the refrigerator, the compressor with first cooling power and the cooling fan with a first rotational speed; upon determining that the temperature of the storage compartment becomes equal to or less than a second reference temperature lower than the first reference temperature while operating the compressor and the cold air transmission unit, turning off, by the controller, the cooling fan; operating, by the controller, the compressor with a second cooling power; and upon determining that the temperature of the storage compartment becomes equal to or greater than the first reference temperature after turning off the cooling fan, operating, by the controller, the cooling fan with a second rotational speed that is determined based on the second cooling power, wherein a rotational speed for the cooling fan changes from an initial setting one or more times before the cooling fan is turned off again.

16. A refrigerator comprising: a storage compartment; a compressor configured to generate cold air for cooling the storage compartment; a cooling fan configured to supply the cold air to the storage compartment; a temperature sensor configured to detect a temperature of the storage compartment; and a controller configured to perform control to change a rotation speed of the cooling fan and cooling power of the compressor such that the temperature of the storage compartment is maintained in a range between a first reference temperature and a second reference temperature lower than the first reference temperature, wherein the controller is configured to turn on the cooling fan when the temperature of the storage compartment becomes equal to greater than the first reference temperature and to turn off the cooling fan when the temperature of the storage compartment becomes equal to or less than the second reference temperature, and wherein the controller is configured to determine the rotation speed of the cooling fan based on the cooling power of the compressor wherein the controller is configured to change the rotational speed of the cooling fan from the initial setting one or more times before the cooling fan is turned off again.

17. The refrigerator of claim 16,
wherein the controller is configured to:
determine the rotation speed of the cooling fan as a first rotation speed, when the cooling power of the compressor is less than a first reference cooling power, the first rotational speed being greater than a second rotational speed, and
determine the rotation speed of the cooling fan as a third rotation speed that is greater than the first rotation speed, when the cooling power of the compressor is equal to or greater than the first reference cooling power.

18. The refrigerator of claim 17, wherein the rotation speed of the cooling fan is changed from one or more of the first rotation speed or the third rotation speed of the cooling fan to the second rotation speed that is less than the first rotation speed before the cooling fan is turned off.

19. The refrigerator of claim 16, wherein the controller is configured to calculate an operating ratio of the cooling fan based on an ON time of the cooling fan and an OFF time of the cooling fan and to determine the cooling power of the compressor based on the operating ratio of the cooling fan.

* * * * *